(12) United States Patent
Le Floch et al.

(10) Patent No.: US 11,702,495 B2
(45) Date of Patent: Jul. 18, 2023

(54) BONDING DISSIMILAR POLYMER NETWORKS IN VARIOUS MANUFACTURING PROCESSES

(71) Applicant: President and Fellows of Harvard College, Cambridge, MA (US)

(72) Inventors: Paul Le Floch, Cambridge, MA (US); Xi Yao, Cambridge, MA (US); Qihan Liu, Cambridge, MA (US); Guodong Nian, Hangzhou (CN); Canhui Yang, Somerville, MA (US); Zhigang Suo, Lexington, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 612 days.

(21) Appl. No.: 16/634,039

(22) PCT Filed: Jul. 24, 2018

(86) PCT No.: PCT/US2018/043459
§ 371 (c)(1),
(2) Date: Jan. 24, 2020

(87) PCT Pub. No.: WO2019/023212
PCT Pub. Date: Jan. 31, 2019

(65) Prior Publication Data
US 2020/0231728 A1    Jul. 23, 2020

Related U.S. Application Data

(60) Provisional application No. 62/635,882, filed on Feb. 27, 2018, provisional application No. 62/536,711, (Continued)

(51) Int. Cl.
*C08F 220/56* (2006.01)
*C08G 77/38* (2006.01)
*D01F 8/04* (2006.01)

(52) U.S. Cl.
CPC ............ *C08F 220/56* (2013.01); *C08G 77/38* (2013.01); *D01F 8/04* (2013.01)

(58) Field of Classification Search
CPC .... C08G 71/34; C08G 77/38; C08G 2210/00; C08G 220/56; B32B 2266/122;
(Continued)

(56) References Cited

U.S. PATENT DOCUMENTS 4,575,476 A    3/1986 Podell et al.
9,176,332 B1    11/2015 Etzkorn et al.
(Continued)

FOREIGN PATENT DOCUMENTS

CN    2465675 Y    12/2001
CN    105732999 A    7/2016
(Continued)

OTHER PUBLICATIONS

Acome et al., "Hydraulically amplified self-healing electrostatic actuators with muscle-like performance," Science, Jan. 5, 2018, vol. 359, pp. 61-65. 6 pages.
(Continued)

*Primary Examiner* — Aiqun Li
(74) *Attorney, Agent, or Firm* — Wilmer Cutler Pickering Hale and Dorr LLP

(57) ABSTRACT

A polymer composite of dissimilar polymers covalently bonded at the interface is disclosed. A method for bonding dissimilar polymers includes providing a first precursor to a hydrogel polymer network comprising a first coupling agent; providing a second precursor to a second polymer network comprising a second coupling agent, wherein the hydrogel polymer network and the second polymer network are different; initiating polymerization of the first precursor to form a hydrogel polymer network, wherein the first coupling agent is incorporated into the polymer network with a
(Continued)

negligible amount of condensation; initiating polymerization of the second precursor to form a second polymer network, wherein the second coupling agent is incorporated into the second polymer network with a negligible amount of condensation; contacting one of the first hydrogel precursor or the hydrogel polymer network with one of the second polymer precursor or second polymer networks and initiating condensation between the first and second coupling agents to form a covalent bond.

15 Claims, 24 Drawing Sheets

Related U.S. Application Data filed on Jul. 25, 2017, provisional application No. 62/536,708, filed on Jul. 25, 2017.

(58) Field of Classification Search
CPC ..... D01F 8/04; D01F 8/10; D01F 8/16; D01F 8/18; D01F 11/04
See application file for complete search history.

(56) References Cited

U.S. PATENT DOCUMENTS

| | | | |
|---|---|---|---|
| 10,302,586 B2 | 5/2019 | Sun et al. | |
| 2007/0134333 A1 | 6/2007 | Thomas et al. | |
| 2013/0109773 A1* | 5/2013 | Hebbrecht | C08L 33/08 521/134 |
| 2015/0071978 A1 | 3/2015 | Chang | |
| 2016/0025669 A1 | 1/2016 | Sun et al. | |
| 2017/0107403 A1 | 4/2017 | Woo et al. | |
| 2017/0307779 A1* | 10/2017 | Marullo | B29D 11/00048 |
| 2019/0070826 A1* | 3/2019 | Zhao | B32B 25/042 |
| 2020/0012140 A1 | 1/2020 | Yang et al. | |

FOREIGN PATENT DOCUMENTS

| | | |
|---|---|---|
| WO | WO-84/00908 A1 | 3/1984 |
| WO | WO-96/23602 A1 | 8/1996 |
| WO | WO-2007/067697 A2 | 6/2007 |
| WO | WO-2014/169119 A1 | 10/2014 |
| WO | WO-2015/073944 A2 | 5/2015 |
| WO | WO-2017/070100 A1 | 4/2017 |
| WO | WO-2018/165100 | 9/2018 |
| WO | WO-2018/165264 | 9/2018 |

OTHER PUBLICATIONS

Aminabhavi et al., "Predicting Water Diffusivity in Elastomers," Polymer Engineering and Science, Dec. 1984, vol. 24(18): p. 1417-1420.

Bai et al., "Transparent hydrogel with enhanced water retention capacity by introducing highly hydratable salt," Applied Physics Letters, published online Oct. 14, 2014, vol. 105(151903). 6 pages.

Barrie et al., "Transport of water in synthetic cis-1,4-polyisoprenes and natural rubber," Polymer, Nov. 1975, vol. 16: p. 811-814.

Boucher et al., "Effects of the formation of copolymer on the interfacial adhesion between semicrystalline polymers," Macromolecules, Jan. 15, 1996, vol. 29, pp. 774-782.

Brinker et al., "Fundamentals of sol-gel dip coating," Thin Solid Films, Jun. 5, 1991, vol. 201(1): p. 97-108.

Cai et al., "Soft Poly(dimethylsiloxane) Elastomers from Architecture-Driven Entanglement Free Design," Advanced Materials, Aug. 10, 2015, vol. 27(35): p. 5132-5140.

Calheiros De Miranda et al., "Daily characterization of air temperature and relative humidity profiles in a cocoa plantation," Pesq. agrospec, bras., Brasilia, Mar. 1994, v.2 9, n.3, pp. 345-353.

Carpi et al., "Dielectric elastomer cylindrical actuators: electromechanical modelling and experimental evaluation," Materials Science and Engineering: C, online Apr. 12, 2004, vol. 24(4): p. 555-562.

Cassagnau et al., "Reactive processing of thermoplastic polymers: A review of the fundamental aspects," International Polymer Processing, Jul. 2007, vol. 22. 69 pages.

Caupin et al., "Cavitation in water: a review," Comptes Rendus Physique, Nov.-Dec. 2006, vol. 7, pp. 1000-1017.

Choi et al., "Light-guiding hydrogels for cell-based sensing and optogenetic synthesis in vivo," Nature Photonics, Dec. 2013, vol. 7(12): p. 987-994.

Choi et al., "Step-index optical fiber made of biocompatible hydrogels," Advanced Materials, Jun. 5, 2015, vol. 27(27): p. 4081-4086.

Crank, "The Mathematics of Diffusion," Oxford University Press, 1975 Second Edition, Clarendon Press, Oxford. 421 pages.

Cristiano et al., "An experimental investigation of fracture by cavitation of model elastomeric networks," Journal of Polymer Science, Part B: Polymer Physics, May 26, 2010, vol. 48, 1409-1422.

Darre et al., "Surgical rubber gloves impervious to methylmethacrylate monomer," Acta Orthopaedica Scandinavica, Jun. 1984, vol. 55(3): p. 254-255.

Dayan et al., "Theoretical Neuroscience: Computational and Mathematical Modeling of Neural Systems. Computational Neuroscience," Cambridge (Massachusetts): MIT Press, Oct. 2001. ISBN: 0-262-04199-5. 432 pages.

EPA United States Environmental Protection Agency, "Indoor Air Quality (IAQ): Fundamentals of Indoor Air Quality in Buildings," Available online Oct. 14, 2015 (https://www.epa.gov/indoor-air-quality-iaq/fundamentals-indoor-air-quality-buildings). 16 pages.

Faulon et al., "Massively Parallel Simulations of Diffusion in Dense Polymeric Structures," Proceedings of the 1997 ACM/IEEE conference on Supercomputing. Nov. 1997. San Jose, CA. 11 pages.

Fierens et al., "Silane-silanol condensation catalyzed by organotin compounds," Reaction Kinetics and Catalysis Letters, Mar. 1978, vol. 8(2): p. 179-187.

Frutiger et al., "Capacitive soft strain sensors via multicore-shell fiber printing," Advanced Materials, published online Mar. 9, 2015, vol. 27(15): p. 2440-2446.

Geise et al., "Fundamental water and salt transport properties of polymeric materials," Progress in Polymer Science, Jan. 2014, vol. 39(1), pp. 1-42.

Gent et al., "Fracture mechanics and cavitation in rubber-like solids," Journal of Materials Science (1991), vol. 26, pp. 3392-3395.

Gent et al., "Internal rupture of bonded rubber cylinders in tension," Proceedings of the Royal Society of London Series A: Mathematical and Physical Sciences, Jan. 1959, vol. 249(1257), pp. 195-205. 14 pages.

Gent et al., "Nucleation and growth of gas bubbles in elastomers," Journal of Applied Physics, May 1969, vol. 40(6): p. 2520-2525. 7 pages.

Gong et al., "Double-Network Hydrogels with Extremely High Mechanical Strength," Advanced Materials, Jul. 17, 2003, vol. 15(14): p. 1155-1158.

Gong, "Why are double network hydrogels so tough?" Soft Matter, vol. 6, 2583-2590, published online Mar. 9, 2010.

Greenspan, "Humidity fixed points of binary saturated aqueous solutions," Journal of Research of the National Bureau of Standards—A, Physics and Chemistry, Jan.-Feb. 1977. vol. 81A(1), pp. 89-96.

Guo et al., "Highly stretchable, strain sensing hydrogel optical fibers," Advanced Materials, Oct. 7, 2016, vol. 28, pp. 10244-10249.

Hanada et al., "Plastic substrate with gas barrier layer and transparent conductive oxide thin film for flexible displays," Thin Solid Films, online Oct. 13, 2009, vol. 518(11): p. 3089-3092.

Haworth et al., "Butyl Rubber Properties and Compounding," Industrial and Engineering Chemistry, Nov. 1942, vol. 34(11): p. 1301-1308.

Helander et al., "Water Vapor Transmission Rate (WVTR) of Elastomeric Materials," 29th National SAMPE Symposium, Apr. 3-5, 1984. 13 pages.

(56) References Cited

OTHER PUBLICATIONS

Hicks et al., "Spandex Elastic Fibers," Science, Jan. 22, 1965, vol. 147(3656): p. 373-379. 8 pages.

Holbrook et al., "Transporting water to the tops of trees," Physics Today, Jan. 2008, vol. 61, pp. 76-77. 3 pages.

Hu et al., "Indentation of polydimethylsiloxane submerged in organic solvents," Journal of Materials Research, Jan. 11, 2011, vol. 26, pp. 785-795.

Hu et al., "Stretchable, porous, and conductive energy textiles," Nano Letters, Jan. 5, 2010, vol. 10(2): p. 708-14.

Huang et al., "Wearable Electronics of Silver-Nanowire/Poly(dimethylsiloxane) Nanocomposite for Smart Clothing" Scientific Reports, Sep. 24, 2015, vol. 5:13971. 9 pages.

Illeperuma et al., "Fire-Resistant Hydrogel-Fabric Laminates: A Simple Concept That May Save Lives," ACS Applied Materials & Interfaces, Dec. 30, 2015, vol. 8(3): p. 2071-2077.

International Search Report and Written Opinion dated Oct. 2, 2018, in the International Application No. PCT/US18/43459. 15 pages.

Iyengar, "Relation of water vapor permeability of elastomers to molecular structure," Polymer Letters, Aug. 1965, vol. 3, pp. 663-669.

Kellomaki et al., "Towards Washable Wearable Antennas: A Comparison of Coating Materials for Screen-Printed Textile-Based UHF RFID Tags," International Journal of Antennas and Propagation, Oct. 30, 2012, vol. 2012:476570. 11 pages.

Keplinger, C., et al., "Stretchable, transparent, ionic conductors." Science, 2013. 341(6149): p. 984-987. 5 pages.

Kim et al., "Highly stretchable, transparent ionic touch panel," Science, Aug. 12, 2016, vol. 353(6300): p. 682-687.

Kundu et al., "Cavitation and fracture behavior of polyacrylamide hydrogels," Soft Matter, vol. 5, pp. 3963-3968. Published online Jul. 21, 2009.

Kurokawa et al., "Formation of a strong hydrogel-porous solid interface via the double-network principle," Acta Biomaterialia (2010), online Nov. 1, 2009, vol. 6(4): p. 1353-1359.

Larson et al., "Highly stretchable electroluminescent skin for optical signaling and tactile sensing," Science, Mar. 4, 2016, vol. 351(6277): p. 1071-1074.

Le Floch et al., "Wearable and Washable Conductors for Active Textiles," ACS Applied Materials & Interfaces, Jul. 11, 2017, vol. 9, No. 30, p. 25542-25552.

Li et al., "Designing hydrogels for controlled drug delivery," Nature Reviews: Materials, Dec. 2016, vol. 1:16071. 17 pages.

Li et al., "Fast-moving soft electronic fish," Science Advances, Apr. 5, 2017, vol. 3:e1602045. 7 pages.

Li et al., "Tough adhesives for diverse wet surfaces," Science, Jul. 28, 2017, vol. 357, pp. 378-381. 4 pages.

Lin et al., "Molecularly Engineered Dual-Crosslinked Hydrogel with Ultrahigh Mechanical Strength, Toughness, and Good Self-Recovery," Advanced Materials, Feb. 11, 2015, vol. 27(12): p. 2054-2059.

Liu et al., "Bonding dissimilar polymer networks in various manufacturing processes," Nature Communications, Feb. 27, 2018, vol. 9, No. 846. 11 pages.

Mao et al., "3D printed reversible shape changing components with stimuli responsive materials," Scientific Reports, Apr. 25, 2016, vol. 6:24761. 13 pages.

Mark et al., "The Science and Technology of Rubber," Fourth Edition, Academic Press, Elsevier, Boston, Apr. 25, 2013. 801 pages.

Mark, "Physical Properties of Polymers Handbook," Second Edition, Jan. 2007, Springer, New York, NY. 1038 pages.

Morgan et al., "Thiol/Ene Photocurable Polymers," Journal of Polymer Science, Jun. 1977, vol. 15(3): p. 627-645.

Osterholtz et al., "Kinetics of the hydrolysis and condensation of organofunctional alkoxysilanes: a review," Journal of Adhesion Science and Technology, Apr. 2, 1992, vol. 6(1), pp. 127-149. 24 pages.

Plueddemann, "Silane adhesion promoters in coatings," Progress in Organic Coatings (1983) vol. 11, issue 3, pp. 297-308.

Plueddemann, "Silane coupling agents," Additives for Plastics, vol. 1, Academic Press, New York, NY, Jan. 28, 1978, pp. 123-167.

Pu et al., "Ultrastretchable, transparent triboelectric nanogenerator as electronic skin for biomechanical energy harvesting and tactile sensing," Science Advances, May 31, 2017, vol. 3:e1700015. 10 pages.

Puskas et al., "Biomedical Application of Commercial Polymers and Novel Polyisobutylene-Based Thermoplastic Elastomers for Soft Tissue Replacement," Biomacromolecules, Jul./Aug. 2004, vol. 5(4): p. 1141-1154.

Puskas et al., "Drug-eluting stent coatings," WIREs Nanomedicine and Nanobiotechnology, Jul./Aug. 2009, vol. 1: p. 451-462.

Puskas et al., "Polyisobutylene-based biomaterials, "Journal of Polymer Science Part A: Polymer Chemistry, May 2004. 42(13): p. 3091-3109.

Quere, "Fluid Coating on a fiber," Annual Review of Fluid Mechanics, Jan. 1999, vol. (31): p. 347-384.

Robinson et al., "Integrated soft sensors and elastomeric actuators for tactile machines with kinesthetic sense," Extreme Mechanics Letters, online Sep. 25, 2015, vol. 5: p. 47-53.

Rosen et al., "Dispersion and Aggregation of Solids in Liquid Media by Surfactants," Chapter 9 (pp. 368-391), Surfactants and Interfacial Phenomena, John Wiley & Sons, Hoboken, New Jersey, Jan. 25, 2012. 26 pages.

Rosen et al., "Reduction of Surface and Interfacial Tension by Surfactants," Chapter 5 (pp. 235-271), Surfactants and Interfacial Phenomena, John Wiley & Sons, Hoboken, New Jersey, Jan. 25, 2012. 39 pages.

Rosen et al., "Surfactants and Molecular Modeling," Chapter 15 (pp. 531-568), Surfactants and Interfacial Phenomena, John Wiley & Sons, Hoboken, New Jersey, Jan. 25, 2012. 40 pages.

Sarwar et al., "Bend, stretch, and touch: Locating a finger on an actively deformed transparent sensor array," Science Advances, Mar. 15, 2017, vol. 3:e1602200. 9 pages.

Scavuzzo et al., "Supramolecular Elastomers. Particulate β-Sheet Nanocrystal-Reinforced Synthetic Elastic Networks," Macromolecules, Mar. 16, 2016, vol. 49(7): p. 2688-2697.

Scriven, "Physics and Application of Dip coating and spin coating," Mat. Res. Soc. Symp. Proc, (1988) vol. 121: p. 717-729.

Seethamraju et al., "Million-Fold Decrease in Polymer Moisture Permeability by a Graphene Monolayer," ACS Nano, Jun. 17, 2016, vol. 10(7): p. 6501-6509.

Sen et al., "Kinetics of silane grafting and moisture crosslinking of polyethylene and ethylene propylene rubber," Journal of Applied Polymer Science, Mar. 5, 1992, vol. 44(7), pp. 1153-1164.

Singh et al., "Introduction to Food Engineering," Fourth Edition, 2009: Elsevier, Boston, MA. Published Oct. 7, 2008, 864 pages.

Song et al., "Reactive coupling between immiscible polymer chains: Acceleration by compressive flow," AIChE Journal, Sep. 2013, vol. 59(9), pp. 3391-3402.

Stokes et al., "Ionic Hydration and Activity in Electrolyte Solutions," Journal of Am. Chem. Soc., May 1948, vol. 70(5): p. 1870-1878.

Sun et al., "Ionic skin,"Advanced Materials, Oct. 29, 2014, vol. 26 (45). 24 pages.

Sun et al., "Highly stretchable and tough hydrogels," Nature, Sep. 6, 2012, vol. 489, pp. 133-136.

Tang et al., "Adhesion between highly stretchable materials," Soft Matter (2016), vol. 12(4): p. 1093-1099. Available online Nov. 4, 2015.

Tian et al., "3D printing of transparent and conductive heterogeneous hydrogel-elastomer systems," Advanced Materials, published online Jan. 11, 2017, vol. 29:1604827. 8 pages.

Tsai et al., "Properties of polyimide/Al2O3 and Si3N4 deposited thin films," Thin Solid Films, online Jan. 14, 2011, vol. 519(15): p. 4969-4973.

van Amerongen, "The Permeability of Different Rubbers to Gases and Its Relation to Diffusivity and Solubility," Journal of Applied Physics, Nov. 1946, vol. 17(11): p. 972-985. 15 pages.

van der Weij et al., "The action of tin compounds in condensation-type RTV silicone rubbers," Macromolecular Chemistry and Physics, Dec. 1980, vol. 181(12): p. 2541-2548.

(56) References Cited

OTHER PUBLICATIONS

Vervust et al., "Integration of stretchable and washable electronic modules for smart textile applications," Journal of the Textile Institute, Oct. 2012, vol. 103(10), pp. 1127-1138.
Visweswaran et al., "Diffusion of water into permeation barrier layers," Journal of Vacuum Science & Technology A, published online Apr. 22, 2015, vol. 33:031513. 14 pages.
Vohra et al., "Developing the Surface Chemistry of Transparent Butyl Rubber for Impermeable Stretchable Electronics," Langmuir, Sep. 21, 2016, vol. 32(40): p. 10206-10212.
Vohra et al., "Reinventing Butyl Rubber for Stretchable Electronics," Advanced Functional Materials, published online May 30, 2016, vol. 26(29): p. 5222-5229.
Williams et al., "Spherical flaw instability in hydrostatic tension," International Journal of Fracture Mechanics, Mar. 1965, vol. 1, pp. 64-72. 10 pages.
Wirthl et al., "Instant tough bonding of hydrogels for soft machines and electronics," Science Advances, Jun. 21, 2017, vol. 3:e1700053. 9 pages.
Witucki, "A silane primer: Chemistry and applications of alkoxy silanes," Journal of Coatings Technology, Reprint, Jul. 1993, vol. 65, No. 822, pp. 57-60.
Yang et al., "Waterproof, Ultrahigh Areal-Capacitance, Wearable Supercapacitor Fabrics," Advanced Materials, published online Feb. 24, 2017, vol. 29:1606679. 9 pages.
Yang et al., "Electroluminescence of Giant Stretchability," Advanced Materials, published online Nov. 26, 2015, vol. 28, pp. 4480-4484.
Yang et al., "Ionic cable," Extreme Mechanics Letters, available online Mar. 7, 2015, vol. 3, pp. 59-65.
Yetisen et al., "Glucose-sensitive hydrogel optical fibers functionalized with phenylboronic acid," Advanced Materials, online Feb. 13, 2017, vol. 29:1606380. 11 pages.
Young, "Humidity Control in the laboratory using salt solutions—A Review," Journal of Applied Chemistry, Sep. 1967, vol. 17: p. 241-245.
Yuk et al., "Skin-inspired hydrogel-elastomer hybrids with robust interfaces and functional microstructures," Nature Communication, vol. 7:12028, Jun. 27, 2016. 11 pages.
Yuk et al., "Tough bonding of hydrogels to diverse non-porous surfaces," Nature Materials, Feb. 2016, vol. 15(2): p. 190-196 and Methods. 9 pages.
Zeng et al., "Fiber-based wearable electronics: A review of materials, fabrication, devices, and applications," Advanced Materials, Aug. 2014, vol. 26(31): p. 5310-36.
Zhu et al., "Design properties of hydrogel tissue-engineering scaffolds," Expert Review of Medical Devices, Sep. 2011, vol. 8(5): p. 607-626. NIH Public Access Author Manuscript 37 pages.

\* cited by examiner

Fig. 2A
Fig. 2B
Fig. 2C
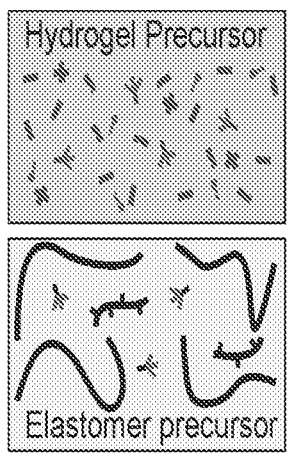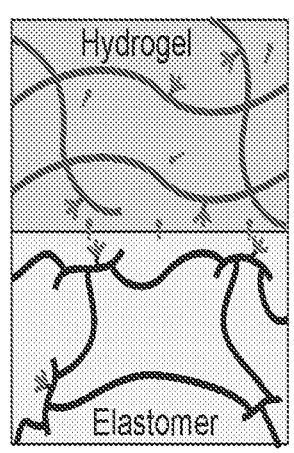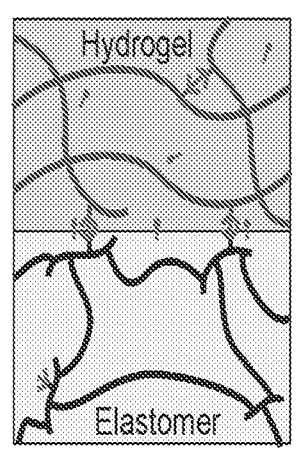

Fig. 4A
Without surfactant
Fig. 4B
With surfactant
Fig. 4C
Too much surfactant
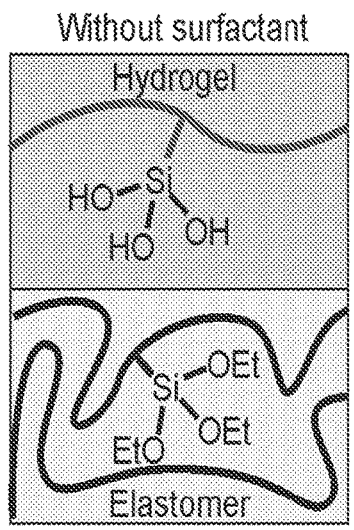
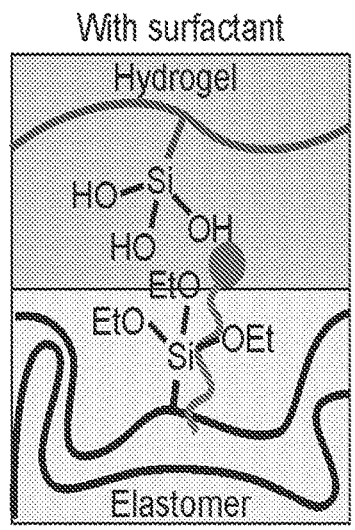
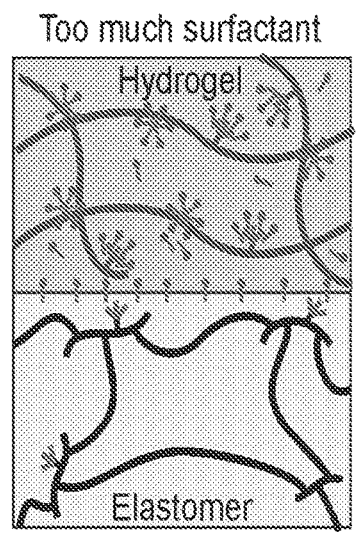
═══ Hydrogel backbone
─── Elastomer backbone
⬤〰️ Surfactant
Zoom out
〜 Surfactant
Ψ Ψ Coupling agent Fig. 16B
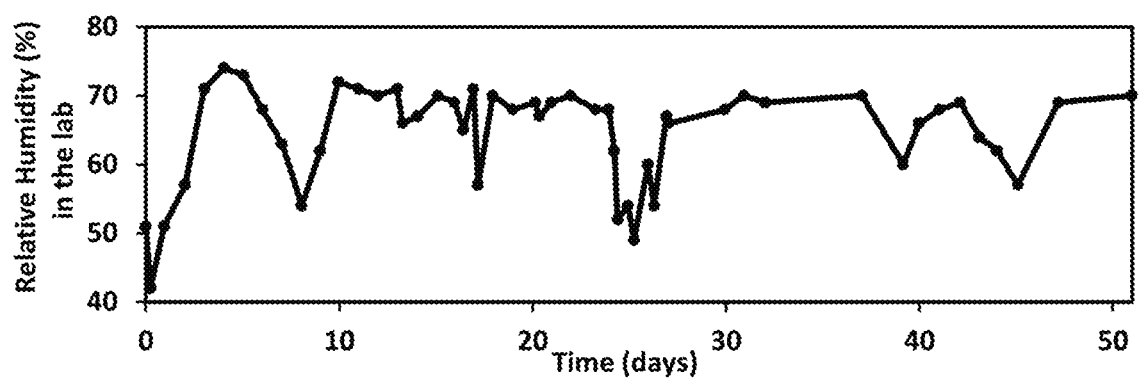
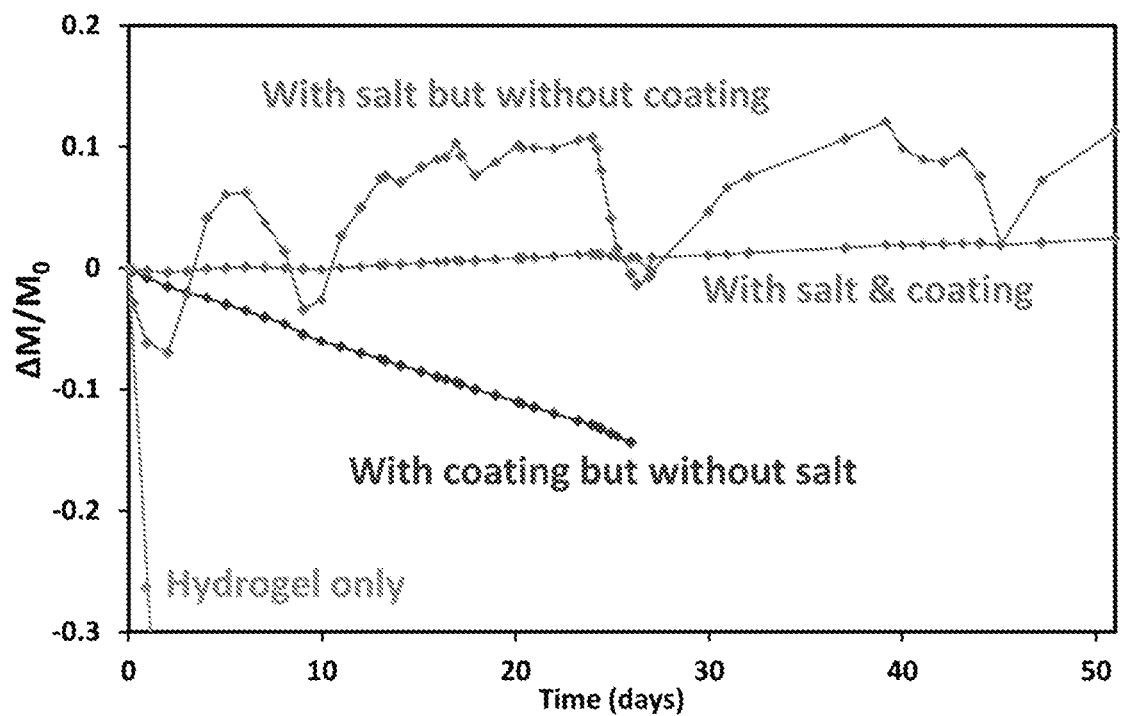
Fig. 17

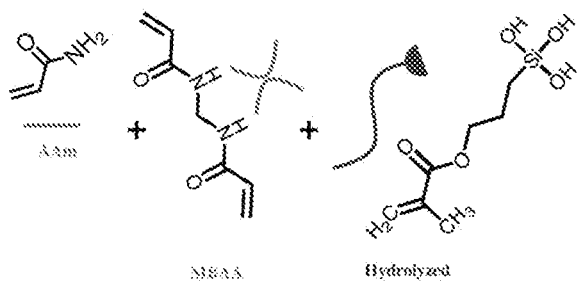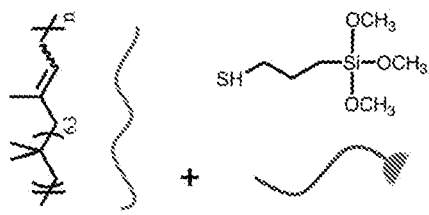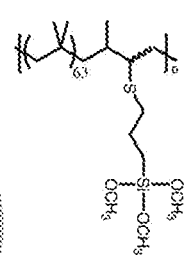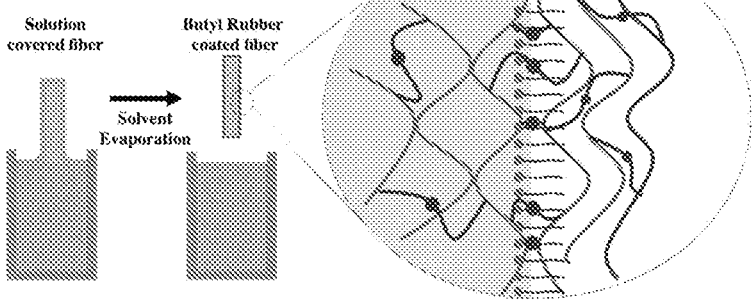
Fig. 21A Polyacrylamide hydrogel
Fig. 21B Polyisobutylene solution
Fig. 21C

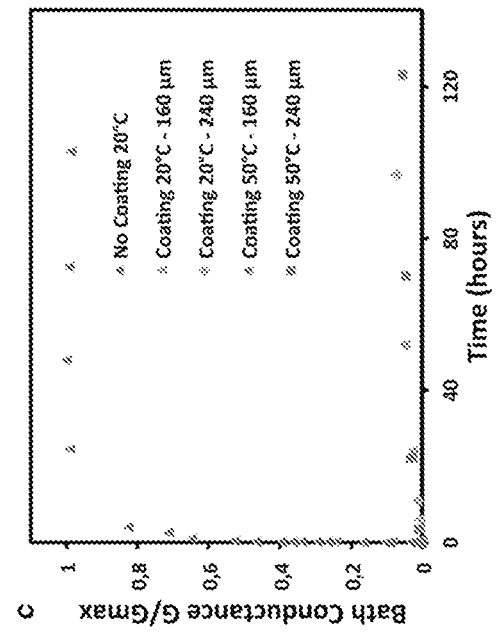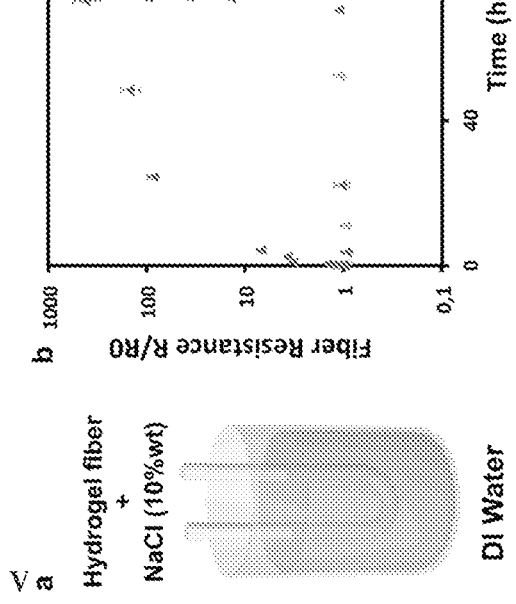

… (1) …

BONDING DISSIMILAR POLYMER NETWORKS IN VARIOUS MANUFACTURING PROCESSES

CROSS-REFERENCE(S) TO RELATED APPLICATIONS

The present application is a National Stage Entry of PCT International Application Number PCT/US2018/043459, filed Jul. 24, 2018, which claims priority to and the benefit of the earlier filing date of U.S. Patent Application No. 62/536,708, filed on Jul. 25, 2017, and entitled "Wearable and Washable Conductors for Active Textiles," U.S. Patent Application No. 62/536,711, filed on Jul. 25, 2017, and entitled "A General Approach to Bond Dissimilar Polymer Networks," U.S. Patent Application No. 62/635,882, filed on Feb. 27, 2018, and entitled "Bonding Dissimilar Polymer Networks in Various Manufacturing Processes," the content of each of which is hereby incorporated by reference herein in its entirety.

STATEMENT REGARDING FEDERALLY SPONSORED RESEARCH OR DEVELOPMENT

The embodiments of the current disclosure were made with United States government support under Grant No. DMR-1420570 awarded by the National Science Foundation. The United States government has certain rights in the embodiments of the current disclosure.

INCORPORATION BY REFERENCE

All patents, patent applications and publications cited herein are hereby incorporated by reference in their entirety in order to more fully describe the state of the art as known to those skilled therein as of the date of the present disclosure.

TECHNICAL FIELD

This technology relates generally to compositions and methods for bonding dissimilar polymers. In particular, embodiments of the current disclosure to a method for bonding hydrogels and hydrophobic elastomers. The technology also relates to applications for compositions containing bonded dissimilar polymers.

BACKGROUND

An integrated circuit achieves its function by integrating dissimilar components, and so does a living organ. A family of recently demonstrated devices mimics the functions of neuromuscular and neurosensory systems—actuating, sensing, and signaling—by integrating hydrogels and elastomers. The hydrogels function as stretchable, transparent, ionic conductors. The elastomers function as stretchable, transparent dielectrics. The elastomers also function as seals to retard dehydration when the devices are in the open air, or to retard the exchange of solutes when the devices are in an aqueous environment. To function as dielectrics and seals, the elastomers must be hydrophobic, with low solubility and diffusivity of water. Demonstrated devices include transparent loudspeakers, ionic skins, ionic cables, stretchable electroluminescent displays, soft touchpads, soft actuators, and triboelectric generators.

The emergence of these devices has posed a fundamental challenge: hydrogels and elastomers without covalent bonds have low adhesion energy (typically below 1 J/m$^2$), far below the fracture energy of common hydrogels (typically around 100 J/m$^2$), and tough hydrogels and elastomers (typically above 1000 J/m$^2$). Existing bonding approaches demonstrate strong adhesion between hydrogels and elastomers, but are restricted to specific sequences of forming the networks. Gluing requires two preformed networks. Grafting after surface activation requires forming one network on a preformed network, which has only been demonstrated to graft a hydrogel on an elastomer, not graft an elastomer on a hydrogel. Copolymerization requires forming two networks together, which, in addition, is only applicable to networks of the same crosslinking chemistry. The restriction to the specific sequences of forming the networks fundamentally limits manufacturing capabilities.

SUMMARY

It remains a challenge to coat and print various hydrogels and elastomers of arbitrary shapes, in arbitrary sequences, with strong adhesion.

In one aspect, strong bonds between dissimilar polymers is described.

In one or more embodiments, coupling agents are mixed into the precursors of the dissimilar polymer networks. The network is formed under conditions that permit the coupling agents to incorporate into the polymer chains, but not to condense. After a manufacturing step, the coupling agents condense, add crosslinks inside the networks, and form bonds between the dissimilar networks. The bonding kinetics can be tuned by changing temperature and pH, and/or by adding surfactants. This approach enables independent bonding and manufacturing.

In one aspect, a method for bonding dissimilar polymers includes providing a first precursor to a hydrogel polymer network comprising a first coupling agent; providing a second precursor to a second polymer network comprising a second coupling agent, wherein the first coupling agent and the second coupling agent are capable of coupling with one another; polymerizing the first precursor to form the hydrogel polymer network, wherein the first coupling agent is incorporated into the hydrogel polymer network; polymerizing the second precursor to form the second polymer network, wherein the second coupling agent is incorporated into the second polymer network; contacting (i) the first precursor with the second precursor; or (ii) the hydrogel polymer network with the second precursor; or (iii) the first precursor with the second polymer network; or (iv) the hydrogel polymer network with the second polymer network; and coupling the first and second coupling agents to form a covalent bond.

In one or more embodiments, the first coupling agent is incorporated into the hydrogel polymer network with negligible condensation and the second coupling agent is incorporated into the second polymer network with negligible condensation.

In one or more embodiments, one or both of the first hydrogel precursor and the second polymer precursor comprises a surfactant.

In one or more embodiments, the surfactant is present near an interface between the hydrogel polymer network and the second polymer network.

In any of the preceding embodiments, the second polymer network is selected from the group consisting of polyurethanes, epoxies, silicones, natural rubbers, synthetic rubbers, and a combination thereof.

In any of the preceding embodiments, wherein the hydrogel polymer network is selected from the group consisting of polyacrylates, polyacrylamides, hyaluronates, alginates, and a combination thereof.

In any of the preceding embodiments, the second polymer network comprises an elastomer.

In any of the preceding embodiments, the elastomer comprises butyl rubber.

In any of the preceding embodiments, contacting includes contacting the first hydrogel precursor with the second polymer network.

In any of the preceding embodiments, contacting includes contacting the first precursor with the second polymer network.

In any of the preceding embodiments, contacting includes contacting the hydrogel polymer network with the second polymer network.

In any of the preceding embodiments, contacting includes contacting the hydrogel polymer network with the second precursor.

In any of the preceding embodiments, the first coupling agent comprises a first moiety that grafts, copolymerizes or reacts with the first precursor and a second moiety that couples with a fourth moiety of the second coupling agent; and the second coupling agent comprises a third moiety that grafts, copolymerizes or reacts with the second precursor and the fourth moiety that couples with the second moiety of the first coupling agent.

In any of the preceding embodiments, the coupling agent comprises a trialkoxysilane.

In any of the preceding embodiments, the first and second coupling agents are the same.

In any of the preceding embodiments, the coupling is carried out via a condensation reaction between the first and second coupling agents to form a covalent bond.

In any of the preceding embodiments, a condensation reaction between the first and second coupling agents to form a covalent bond is controlled by pH, temperature, surfactant, catalyst, or combinations thereof.

In any of the preceding embodiments, no more than 10 mol %, or no more than 15 mol %, or no more than 20 mol %, or no more than 25 mol %, or no more than 30 mol %, or no more than 35 mol %, or no more than 40 mol %, or no more than 45 mol %, or no more than 50 mol %, or no more than 55 mol %, or no more than 60 mol %, or no more than 65 mol %, or no more than 70 mol %, or no more than 75 mol %, or no more than 80 mol %, or no more than 85 mol %, or no more than 90 mol % of the first and/or second coupling agent is condensed in the hydrogel polymer network and the second polymer network, respectively, before contact.

In any of the preceding embodiments, the hydrogel polymer network is oxygen tolerant.

In any of the preceding embodiments, the dissimilar polymers are temperature stable.

In any of the preceding embodiments, the dissimilar polymers are manufactured by casting, spin-coating, dip-coating, 3D printing or laminating.

In any of the preceding embodiments, the method comprises, after said contacting, forming a fiber.

In any of the preceding embodiments, the method comprises, after said contacting, forming multiple alternating layers.

In any of the preceding embodiments, the multiple alternating layers are co-pressed before said coupling.

In any of the preceding embodiments, the first and/or second coupling agents are silane coupling agents.

In any of the preceding embodiments, the first and/or second coupling agents are alkoxysilane.

In any of the preceding embodiments, the first and/or second coupling agents are trialkoxysilane.

In any of the preceding embodiments, the covalent bond is siloxy (Si—O—Si) bond.

In any of the preceding embodiments, the silane coupling agent further include an organofunctional group.

In one aspect, a polymer composite comprises a hydrogel polymer network; and an elastomer polymer network, wherein the elastomer polymer network is covalently bonded at an interface to the hydrogel polymer network.

In any of the preceding embodiments, the covalent bond is a siloxy (Si—O—Si) bond.

In any of the preceding embodiments, the hydrogel polymer network is coated with and encapsulated by the elastomer polymer network and the composite is capable of being heated above the boiling temperature of water without losing the hydrogel water content.

In any of the preceding embodiments, the elastomer polymer network is selected from the group consisting of polyurethanes, epoxies, silicones, natural rubbers, synthetic rubbers, and a combination thereof.

In any of the preceding embodiments, the elastomer polymer network comprises butyl rubber.

In any of the preceding embodiments, the hydrogel polymer network is selected from the group consisting of polyacrylates, polyacrylamides, hyaluronates, alginates, and a combination thereof.

In any of the preceding embodiments, the polymer composite is a dehydration-resistant, wherein the hydrogel polymer network comprises a hygroscopic salt.

In any of the preceding embodiments, the covalent bond is siloxy (Si—O—Si) bond.

In any of the preceding embodiments, the elastomer polymer network encapsulates the hydrogel polymer network.

In any of the preceding embodiments, the hydroscopic salt is selected from lithium chloride, magnesium chloride, sodium chloride (NaCl), sodium hydroxide (NaOH), potassium chloride (KCl) calcium chloride ($CaCl_2$), sodium iodide (NaI), potassium acetate ($CH_3COOK$), and a combination thereof.

In any of the preceding embodiments, the hydrogel polymer network is in the form of a fiber.

In any of the preceding embodiments, the fiber is part of a textile.

In any of the preceding embodiments, the polymer composite is washable.

In any of the preceding embodiments, the polymer composite is an ionic conductor.

In any of the preceding embodiments, the elastomer polymer network is selected from the group consisting of polyurethanes, epoxies, silicones, natural rubbers, synthetic rubbers, and a combination thereof.

In any of the preceding embodiments, the elastomer polymer network comprises butyl rubber.

In any of the preceding embodiments, the hydrogel polymer network is selected from the group consisting of polyacrylates, polyacrylamides, hyaluronates, alginates, and a combination thereof.

In one or more embodiment, coupling agents are mixed into the precursors of the dissimilar polymer networks. The network is formed under conditions that permit the coupling agents to incorporate into the polymer chains, but not to condense. After a manufacturing step, the coupling agents condense, add crosslinks inside the networks, and form bonds between the dissimilar networks. The bonding kinetics can be tuned by changing temperature and pH, and/or by adding surfactants. This approach enables independent bonding and manufacturing.

In some embodiments, oxygen-tolerant hydrogel resins are formulated for spinning, printing, and coating in the open air.

In some embodiments, thin elastomer coating prevents hydrogels from solvent exchange with the environment, e.g. contamination from ambient water solution or dehydration in the open air.

In some embodiments, thin elastomer coatings enable hydrogels to sustain high temperatures without boiling.

These capabilities open doors to new applications, such as soft touchpads and soft displays for smart clothes that one can wear, wash, and iron.

Elastomer-coated hydrogels will enable applications at elevated temperatures, for example, as stretchable and transparent conductors to enable soft touchpads and displays for smart clothes that one can wear, wash, and iron. The capability will also enable hydrogels to integrate elastomers requiring high-temperature processes, such as vulcanization.

In summary, methods to bond various hydrogels and hydrophobic elastomer for various materials in various manufacturing processes are disclosed. Oxygen tolerant hydrogel resins for printing, coating and drawing in the open air are described. Elastomer-coated hydrogels can sustain high temperature without boiling. Applications for this method include rapid-prototyping and mass-producing biomimetic hydrogel-elastomer devices for healthcare, fashion, and augmented reality.

BRIEF DESCRIPTION OF THE DRAWING

Embodiments of the current disclosure are described with reference to the following figures, which are for the purpose of illustration only and not intended to be limiting.

FIGS. 2A-2C show a schematic illustration of a hydrogel and an elastomer forming covalent bonds after a manufacturing process according to one or more embodiments, in which FIG. 2A shows coupling agents mixed into the precursors of a hydrogel and an elastomer separately; FIG. 2B shows that during the formation of the two networks, the coupling agents are covalently incorporated into the networks, but do not condense; and FIG. 2C shows that after a manufacturing process, the coupling agents condense, add crosslinks in the individual networks, and form bonds between the networks.

FIGS. 4A-4C show a schematic illustration of the effect of surfactant to the polymer system according to one or more embodiments.

FIG. 16B is a plot of the daily variation of relative humidity in a laboratory setting in Cambridge, Mass., June-July 2016.

FIG. 17 is a plot of the associated variations in the masses of polyacrylamide hydrogels with or without salt (8 M LiCl) and elastomer coating (0.5 mm PDMS.

FIGS. 21A-21C is a schematic illustration of the process for dip-coating hydrogel B with butyl B; FIG. 21A shows a polyacrylamide (PAAm) hydrogel forms, with the PAAm chains incorporating a trialkoxysilane coupling agent (TMSPMA). The PAAm chains cross link by MBAA, but not yet by the TMSPMA. The hydrogel also contains a salt (NaCl) and a surfactant (Brij© L4). FIG. 21B shows the trialkoxysilane coupling agent (MPTMS) reacts with the double bonds in the polyisobutylene (PIB) chains. The PIB chains are not yet crosslinked, and are dissolved in a solvent (cyclohexane) to form a viscous liquid. FIG. 21C shows dip-coat the hydrogel with the PM solution. As cyclohexane evaporates, silanes form crosslinks between the PIB chains, the PAAm chains, as well as between the hydrogel and the butyl rubber.

FIG. 23A shows the set-up used to determine salt loss from a hydrogel-elastomer hybrid fiber. FIG. 23B reports the relative resistance of the fibers change with time, and FIG. 23C reports the relative conductance of the bath changes with time.

DETAILED DESCRIPTION

For various applications, creating strong bonding between a hydrogel and a hydrophobic elastomer is desirable in various manufacturing processes. In some embodiments, the present disclosure describes forming a robust bonding between a hydrogel and a second dissimilar polymer. In addition, the present disclosure describes manufacturing steps that can occur in any order. For example, a second polymer can be applied to a hydrogel, or the hydrogel can be applied to the second polymer. The bonding methods can be used with a range of manufacturing processes, including direct attachment, printing, multilayer-co-drawing/co-pressing, and coating.

Figure 1:
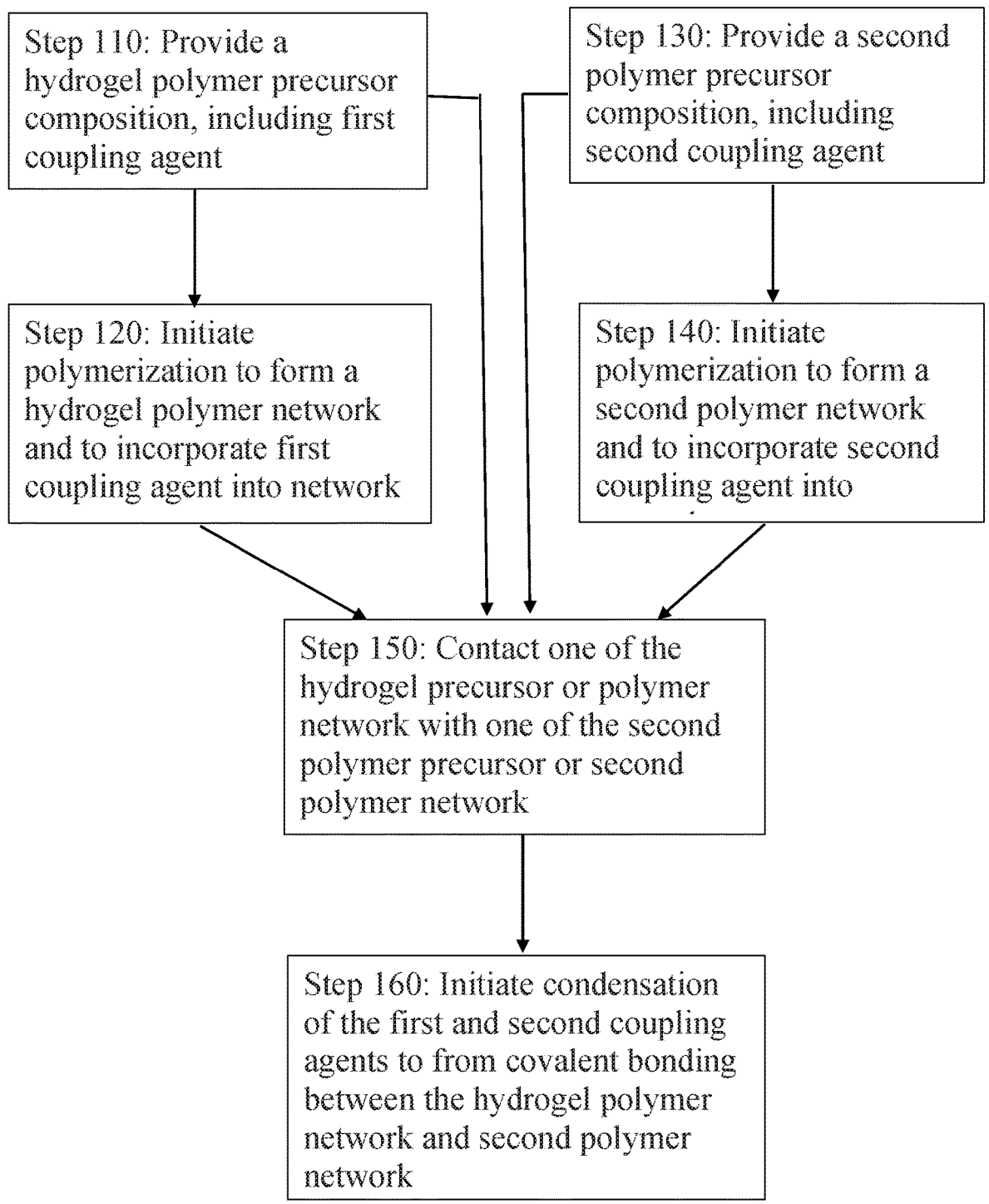
FIG. 1 is a flow diagram illustrating a method of bonding dissimilar polymers according to one or more embodiments.

As illustrated in FIG. 1, a method of bonding dissimilar polymer networks is provided. In some embodiments, one of the polymer networks is a hydrogel.

As an initial step 110, a precursor to a hydrogel polymer network is provided. For example, a polymer network swollen with water that can dissolve ions of multiple moles per liter can be utilized as a hydrogel polymer network. Exemplary non-limiting examples include, free-radical polymerized hydrogels, alginates, hyaluranates and polyacrylamides. In exemplary embodiments, polyacrylamide, polyacrylic acid, poly N-isopropylacrylamide (PNIPAM), poly hydroxy ethyl methacrylate (PHEMA), can be used as the base material for the hydrogel. The precursor can include those components used to form a hydrogel polymer network, such as monomers or low molecular weight oligomers and crosslinkers. Suitable polymerization and/or crosslinking initiators can be added, as needed. A first coupling agent with a suitable functional group can be added to the precursor composition so that on polymerization, the coupling agents are grafted or copolymerized into the networks.

In a subsequent step 120, the hydrogel precursor can be reacted to polymerize the monomers and/or oligomers. In the case of hydrogel formation, the reaction can be carried out in the presence of water so that water is entrained in the polymer network. In certain embodiments, a negligible amount of reaction (e.g., couple or condense to form covalent bonds) of the first coupling agent with each other within the hydrogel polymer network and/or with the hydrogel polymer network occurs at this point. In other embodiments, the first coupling agents in the hydrogel precursor can react among themselves (e.g., couple or condense to form covalent bonds) and/or react with the hydrogel polymer network and serve as crosslinkers to further connect the growing polymer chains. Nevertheless, a sufficient amount of reactive first coupling agents may still remain such that they can react with a second coupling agent found in the second precursor or second polymer network as described more fully below.

In step 130, a second precursor to a second polymer network is provided. The second polymer network is dissimilar to the hydrogel polymer network. Non-limiting examples of polymer networks suitable for use as the second polymer network include polyurethane resins, epoxy resins, addition cured silicones, condensation cured silicones, and rubbers, e.g., natural rubbers, butyl rubber, nitrile rubber, etc. The second polymer network can also be a second hydrogel polymer network. In one or more embodiments, the second polymer network is a hydrophilic polymer. In one or more embodiments, the second polymer is a hydrophobic elastomer. Exemplary elastomers include a silicone rubber, an acrylonitrile-butadiene rubber (NBR), a hydrogenated acrylonitrile-butadiene rubber (H-NBR), an ethylene-propylene-diene rubber (EPDM), an acrylic rubber, a urethane rubber, an epichlorohydrin rubber, a chlorosulfonated polyethylene, and a chlorinated polyethylene. The precursor can include those components used to form the second polymer network, such as monomers or low molecular weight oligomers and crosslinkers. Suitable polymerization and/or crosslinking initiators can be added, as needed. A second coupling agent with a suitable functional group can be added to the second precursor composition so that on polymerization, the coupling agents are grafted or copolymerized into the networks.

In a subsequent step 140, the second precursor is reacted to polymerize the monomers and/or oligomers. Optionally, crosslinker can be utilized to further connect the growing polymer chains. In the case of the second polymer network formation, the reaction can occur in any suitable solvent. In certain embodiments, the second polymer network formation can take place without the presence of a solvent (e.g., neat). In certain embodiments, a negligible amount of reaction (e.g., couple or condense to form covalent bonds) of the second coupling agent with each other within the second polymer network and/or with the second polymer network occurs at this point. In other embodiments, the second coupling agents in the second precursor can react among themselves (e.g., couple or condense to form covalent bonds) and/or react with the second polymer network and serve as crosslinkers to further connect the growing polymer chains. Nevertheless, a sufficient amount of reactive second coupling agents may still remain such that they can react with the first coupling agent found in the first precursor or hydrogel polymer network as described more herein.

In some embodiments, negligible amount of condensation described above with reference to steps 120 and 140 can ensure sufficient amount of free, unreacted first and second coupling agents present in the hydrogel network and the second network, respectively, to undergo coupling reactions (e.g., condensation reaction) between first and second coupling agents to form covalent bonds when the two polymer networks are brought into contact and allowed to react.

Step 110 followed by 120 and step 130 followed by 140 are independent from each other, and may happen in any desired sequence.

The kinetics of the coupling reaction is adjusted such that when the precursors react to form separate networks, the coupling agents copolymerize into the networks, but undergo negligible condensation, e.g., couple, with other components. As discussed in greater detail below, the kinetics of condensation (and therefore bonding) can be tuned by changing reaction conditions, such as by way of example pH and temperature, and/or by the addition of catalysts and/or surfactants.

In some embodiments, "negligible condensation" or "substantially no condensation" of the first coupling agent means no more than 10 mol %, or no more than 15 mol %, or no more than 20 mol %, or no more than 25 mol % of the first coupling agent is condensed or coupled among themselves when the hydrogel polymer network is formed and before the hydrogel polymer network is in contact with the second polymer network. Similarly, in some embodiments, "negligible condensation" or "substantially no condensation" of the second coupling agent means no more than 10 mol %, or no more than 15 mol %, or no more than 20 mol %, or no more than 25 mol % of the second coupling agent is condensed or coupled among themselves when the second polymer network is formed and before the second polymer network is in contact with the hydrogel polymer network.

During the formation of the hydrogel polymer network, the first coupling agent may couple (e.g., condense) among themselves to form covalent bonds thereby reducing the amount of free first coupling agent available for coupling (e.g., condensation) reaction with the second coupling agent of the second polymer work. Similarly, during the formation of the second polymer network, the second coupling may couple (e.g., condense) among themselves to form covalent bonds thereby reducing the amount of the free second coupling agent available for coupling (e.g., condensation) with the first coupling agent of the hydrogel polymer network. However, as long as some free coupling agent is available in both the hydrogel polymer network and the second polymer network, some condensation can take place. As long as some coupling reaction (e.g., condensation) of the first and second coupling agents takes place across the interface of the two polymer networks, a degree of bonding of the two networks is generated. The exact amount of bonding required can be application-specific. In one or more embodiments, no more than 10 mol %, or no more than 15 mol %, or no more than 20 mol %, or no more than 25 mol %, or no more than 30 mol %, or no more than 35 mol %, or no more than 40 mol %, or no more than 45 mol %, or no more than 50 mol %, or no more than 55 mol %, or no more than 60 mol %, or no more than 65 mol %, or no more than 70 mol %, or no more than 75 mol %, or no more than 80 mol %, or no more than 85 mol %, or no more than 90 mol % of the first coupling agent is condensed during the formation of the hydrogel polymer network before contact with the second polymer network. Similarly, in one or more embodiments, no more than 10 mol %, or no more than 15 mol %, or no more than 20 mol %, or no more than 25 mol %, or no more than 30 mol %, or no more than 35 mol %, or no more than 40 mol %, or no more than 45 mol %, or no more than 50 mol %, or no more than 55 mol %, or no more than 60 mol %, or no more than 65 mol %, or no more than 70 mol %, or no more than 75 mol %, or no more than 80 mol %, or no more than 85 mol %, or no more than 90 mol % of the second coupling agent is condensed during the formation of the second polymer network before contact with the hydrogel polymer network.

As shown below, systems with more than 90% of the coupling agents condensed can nonetheless form strong interfacial bonds. In FIG. 19D, a 3-day old hydrogel is robustly bonded to a 7-day old PDMS. While more than 90% of the coupling agent has reacted within the polymer networks (the condensation reactions can be slowed/controlled, but not eliminated), the bonding is nonetheless sufficiently robust that fracture occurs in the hydrogel and not at the interface. The additional degree of crosslinking within the polymer network may affect the individual moduli of the polymer networks, but can be compensated for, as is discussed below. In either the hydrogel or the second polymer, the amounts of the coupling agents and the conventional crosslinkers can be independently varied. These variables allow the independent tuning of the moduli of the networks and the adhesion between the networks.

During or after one or more of steps 110-140, one of the hydrogel precursor or polymer network can be contacted with one of the second polymer precursor or second polymer network. By way of example, both the hydrogel and second polymer networks can be preformed and the hydrogel polymer network and the second polymer network can be contacted with one another, e.g., steps 110-140 are carried out before step 150. In other embodiments, the hydrogel polymer network can be preformed, e.g., steps 110 and 120 are carried out, and brought into contact with the second polymer precursor (step 150) before the second polymer network of step 140 is formed. In other embodiments, the second polymer network can be preformed, e.g., steps 130 and 140 are carried out, and brought into contact (step 150) with the hydrogel polymer precursor in step 110 before the hydrogel polymer network of step 120 is formed. In other embodiments, the hydrogel polymer precursor in step 110 and the second polymer precursor in step 130 can be brought into contact (step 150), and the subsequent steps 120 and 140 of polymerization can be carried out after contact (step 150). The methods according to one or more embodiments allow printing and polymerizing of various hydrogels and polymer networks in any desired sequences.

Regardless of the order of operations of steps 110-140, after contact, the first and second coupling agents are left to couple, e.g. condense, (step 160) to form covalent bonding adding crosslinks both inside the individual polymer layers and between polymers. Elevated temperature or pH change may be applied in step 160 to accelerate the condensation. As used herein, a coupling reaction may include any reaction form covalent bonds. In some embodiments, a coupling reaction may include, for example, a condensation reaction.

In some embodiments, the kinetics of the coupling reaction are controlled by adjusting the pH. By way of example, a polymerization reaction for one or more of the polymer networks can be carried out at a first pH that inhibits or slows down the coupling reaction. Once the polymer networks are brought in contact with one another, the pH can be adjusted to increase the reactivity of the coupling reaction.

In some embodiments, the kinetics of the coupling reaction are adjusted by using a surfactant. In one or more embodiments, a surfactant is added to the hydrogel precursor. The pre-hydrolysis coupling agent used in the second polymer precursor and retained in the second polymer network on polymerization can be hydrophobic, and therefore is difficult to stick into the hydrogel. The surfactant adsorbs at the hydrogel-elastomer interface, and helps coupling agent on the elastomer chains get solvated and to react with the coupling agent from the hydrogel system. In one or more embodiments, the surfactant concentration is maintained below the micelle concentration, e.g., the concentration at which the surfactant aggregates to form micelles.

In some embodiments, temperature can be used to control the kinetics of the coupling reaction. Higher temperature speeds up the bonding and reduces the amount of required coupling agent in the second polymer network.

In some embodiments, catalysts can be added to the second polymer system to accelerate the hydrolysis and condensation of the coupling agents. By way of example, the reactivity of alkoxysilanes as the coupling agent in the second polymer system can be enhanced by addition of tin-based catalysts.

In still other instances, the coupling reaction can be triggered by an external stimulus, such as ultraviolet energy.

The separate polymer precursors or polymer networks can be processed into any desired shape before bonding. For example, the polymer networks (or precursors thereto) can be deposited by any conventional process, such as casting, spin coating, dip coating, three-dimensional (3D) printing, conventional printing or screen, and the like.

In one or more embodiments, the polymer networks can be tuned to alter the modulus, e.g., to toughen or stiffen one or both of the polymer networks. Achieving high fracture energy requires the synergy of strong and weak bonds. Fracture breaks not only one layer of strong bonds, but also breaks many more weak bonds, greatly amplifying the measured fracture energy. In one or more embodiments, the stiffness of the hydrogel polymer network can be modified to introduce other bonding modes that increase the strength of the bond. By way of example, a secondary polymer network can be introduced into the hydrogel layer, whose network is made up of weaker interactions, e.g., ionic crosslinks instead of covalent crosslinks.

Free-radical polymerized hydrogels are widely used in bioengineering, optics, and soft ionic devices. Since the free radicals can be quenched by oxygen, in one or more embodiments, a hydrogel precursor is selected to provide oxygen-tolerant hydrogel resins. In addition, resins of certain ranges of viscosity are required in many manufacturing processes, such as printing, extrusion, rolling, and embossing. The viscosity of a monomer precursor solution is too low for these processes. However, the precursor becomes a viscous fluid right after curing, and its viscosity can be tuned using a chain transfer agent.

In addition, resins of certain ranges of viscosity are required in many manufacturing processes, such as printing, extrusion, rolling, and embossing. The viscosity of a monomer precursor solution is too low for these processes.

The method is illustrated with reference to FIGS. 2A-2C. In this example, the upper polymer network is a hydrogel, e.g., a free-radical polymerized polyacrylamide (PAAm) hydrogel, and the lower polymer network is an elastomer, e.g., an addition-cured polydimethylsiloxane (PDMS) elastomer (both shown in FIG. 2A). Both precursor compositions contain coupling agents, e.g., a trialkoxysilane, that are functionalized to graft onto or polymerize with its respective polymer precursor. The precursor compositions are separately polymerized to form their respective polymer networks, as shown in FIG. 2B. The kinetics are controlled such that when the precursors form separate networks, the coupling agents copolymerize into the networks, but do not condense. After a manufacturing step, e.g., processing the polymers into the form factors that will be useful in a practical application, the coupling agents condense, adding crosslinks inside the individual networks, and forming bonds between the networks, as is shown in FIG. 2C.

The coupling agents with a suitable functional group can be grafted or copolymerized into the networks. The coupling agent is selected to have organofunctional group (R) that is reactive with the polymer network precursors which enables its incorporation into the polymer network and a region or moiety that is reactive with the coupling agent of the other polymer network. Table 1 lists exemplary organofunctional groups R that can be used to incorporate the coupling agent into the polymer according to one or more embodiments. Exemplary functional groups of the polymer precursors and the polymer that can be the basis of the second polymer network are also shown.

TABLE 1

| Exemplary organofunctional groups and polymers that can be modified |||
|---|---|---|
| Coupling group R | Functional group to couple with | Possible polymers |
| methacrylate group | acrylate or methacrylate | Acrylic resin, Free-radical polymerized hydrogel |
| —NH$_2$ | O=C=N— | Polyurethane resin |
| epoxide | | Epoxy resin (high temperature) |
| HOOC— | | Alginate, Hyaluronate, Polyacrylic acid |
| vinyl | H—Si—CH$_3$ | Addition cure silicone |

TABLE 1-continued

Exemplary organofunctional groups and polymers that can be modified

| Coupling group R | Functional group to couple with | Possible polymers |
| --- | --- | --- |
| —SH | (alkene) or (diene) | Unsaturated rubbers: natural rubber, butyl rubber, nitrile rubber, etc. |
| | (epoxide) | Epoxy resin (room temperature) |

In one or more embodiments, the coupling agents are silane coupling agents. Silane coupling agents can be used with the precursors of both the hydrogel and the second polymer. In a silane coupling agent, a silicon atom links hydrolysable groups OX (e.g., hydroxy, acetoxy, chloro) and the organofunctional group R, as shown in Eq. 1. During the formation of a polymer network, the organofunctional group covalently incorporates the trialkoxysilane into the network. In the presence of water, the alkoxy groups hydrolyze into silanol groups. Subsequently, the silanol groups condense to form a siloxane bond. Because silanes require hydrolysis to couple, there is no coupling in the elastomer phase until they contact the hydrogel network.

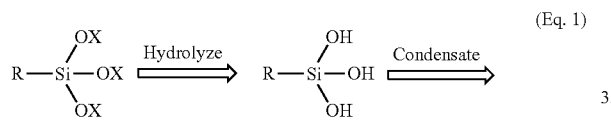

(Eq. 1)

Silane coupling agents can include the various choices of the organofunctional group listed in Table 1 above, allowing the approach to be used in different polymer systems. Eq. 2 shows the addition of 3-(Trimethoxysilyl)propyl methacrylate (TMSPMA) with a polyacrylamide free radical in a radical-polymerized hydrogel.

(Eq. 2)

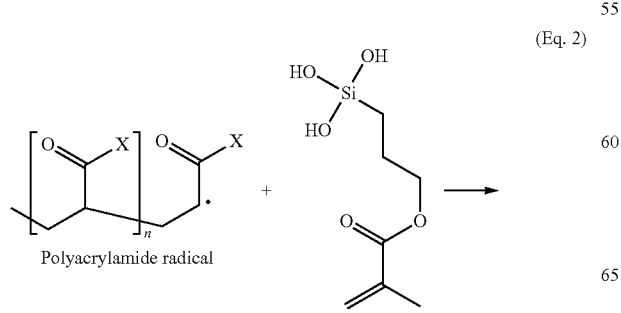

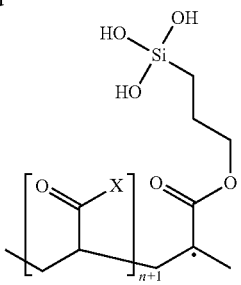

-continued

Eq. 3 shows the addition of triethoxyvinylsilane (TEOVS) with Pt-catalyzed PDMS, e.g., Sylgard 184 and Ecoflex 0020.

(Eq. 3)

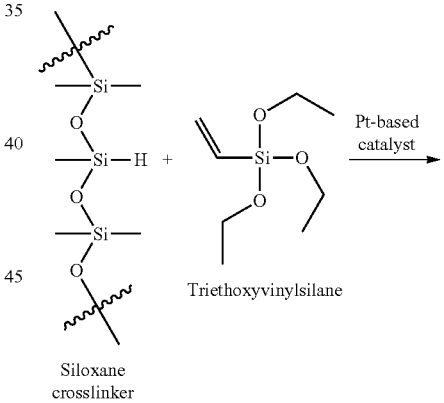

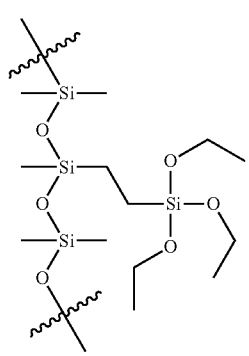

Eq. 4 shows the addition of 3-(Mercaptopropyl) trimethoxysilane (MPTMS) with polybutadiene in a uv-initiated polymerization.

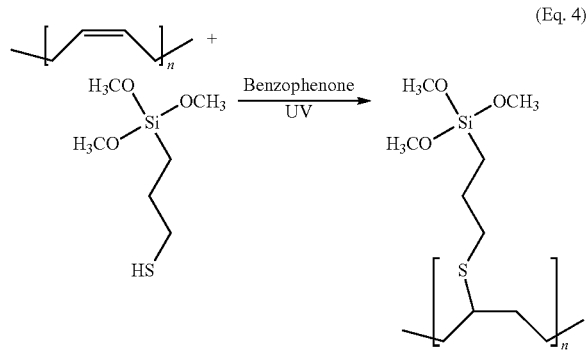

(Eq. 4)

Silane coupling agents with other functional groups are commercially available, allowing the technique to be used in a wide range of polymer systems.

In one or more embodiments, the rate of coupling agent condensation is controlled so that condensation occurs on a different time-scale than formation of the polymer network.

The kinetics of the coupling reaction can be controlled in a variety of ways. For example, when using silane coupling agents (or other coupling agents that rely on hydrolysis for the reaction to proceed), pH can be used to reduce the coupling rate. Mobile silanols in an aqueous solution condense at a rate depending on the pH, and the lowest rate occurs around pH=4. Similar behavior is observed for silanols fixed on the polymer chains. In one exemplary hydrogel system, the PAAm hydrogel, α-ketoglutaric acid is used as the initiator to form PAAm hydrogels, resulting in a pH~3.5 in the precursor. In contrast, when using hydrophobic polymers, such as PDMS, the coupling agents rarely hydrolyze and condense. For most practical purposes, the coupling agents in the PDMS can be treated as nonreactive.

Figure 3A:
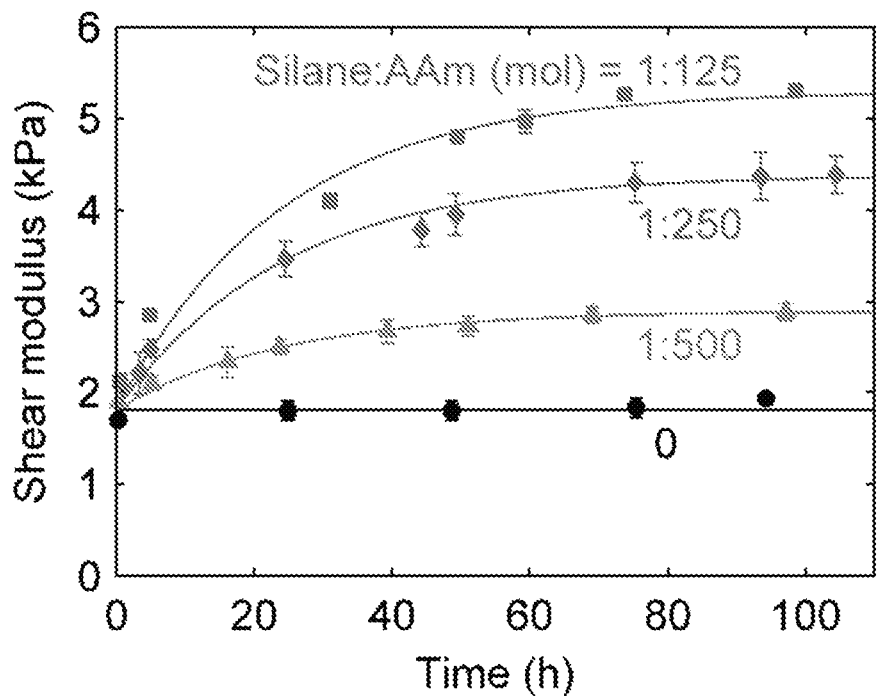
FIGS. 3A-3D are plots of shear modulus vs time, illustrating the kinetics of silane coupling agents in polyacrylamide (PAAm) and polydimethylsiloxane (PDMS).
Figure 3B:
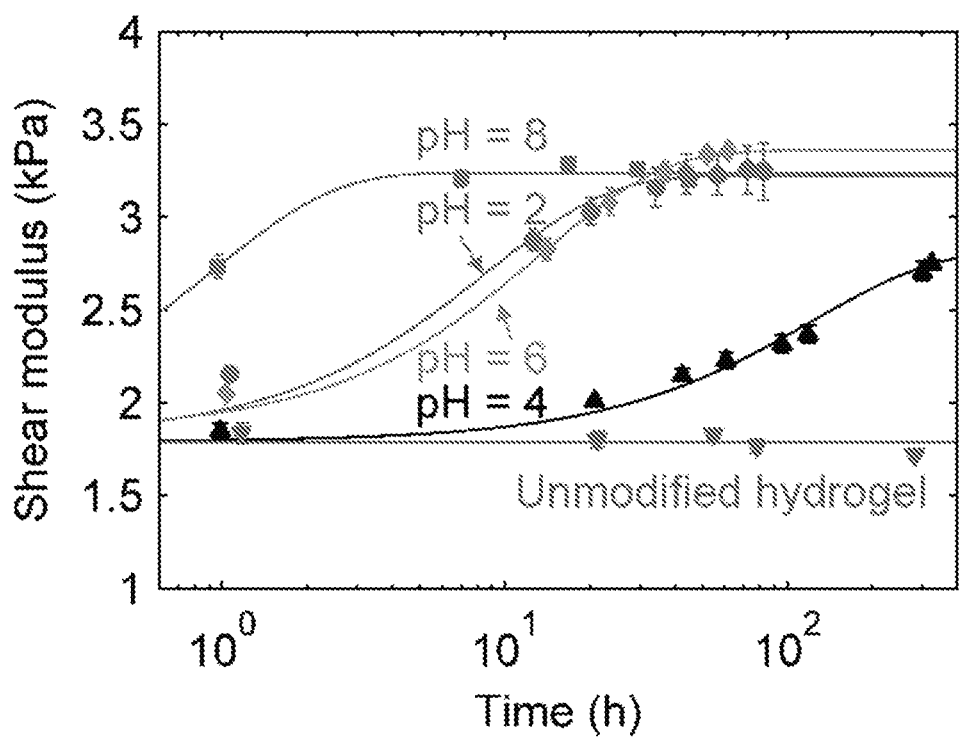

The intra-network condensation is described with reference to an exemplary silane-modified network system using PAAm and PDMS; however, the methods and embodiments described can be readily applied to any other polymer system. The initial PAAm network forms by the conventional crosslinker N, N methylenebisacrylamide (MBAA). During the formation of the initial PAAm network, the coupling agents copolymerize into the polymer chains, but do not condense, so that the shear modulus of the initial network is unaffected by the coupling agents. FIG. 3A is a plot of shear modulus vs. time of PAAm hydrogels at different coupling agent levels. The modulus of the PAAm hydrogel changes with time as the coupling agents condense. The amount of coupling agent does not affect the initial modulus, but affects the modulus after condensation. Subsequently, the coupling agents condense and add crosslinks, so that the shear modulus of the PAAm hydrogel increases with time. The delay time is independent of the amount of the coupling agent, but is affected by pH. As is shown in FIG. 3B, a pH of 4.0 has the longest delay time over a pH range of 2-8. As the coupling agents condense and add crosslinks, the shear modulus of the hydrogel is expected to increase, so that a smaller change in shear modulus correlate to a lower condensation rate. When α-ketoglutaric acid is used as the initiator to form PAAm hydrogels, the resulting pH is ~3.5 in the precursor, so that the kinetics of condensation is expected to be slow.

Figure 3C:
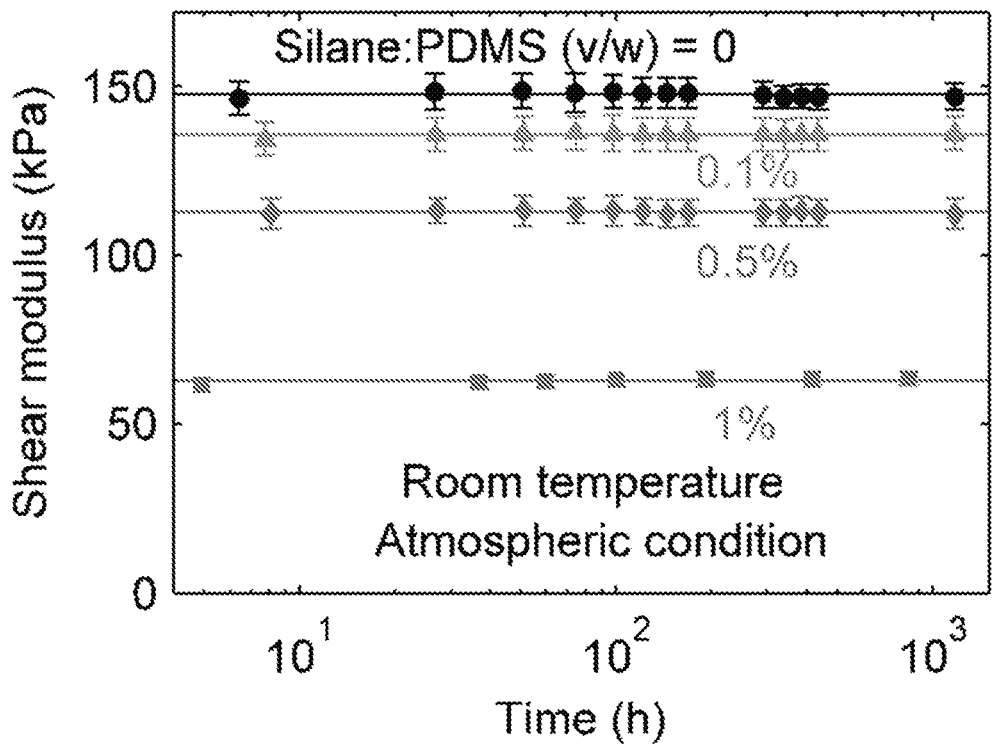
Figure 3D:
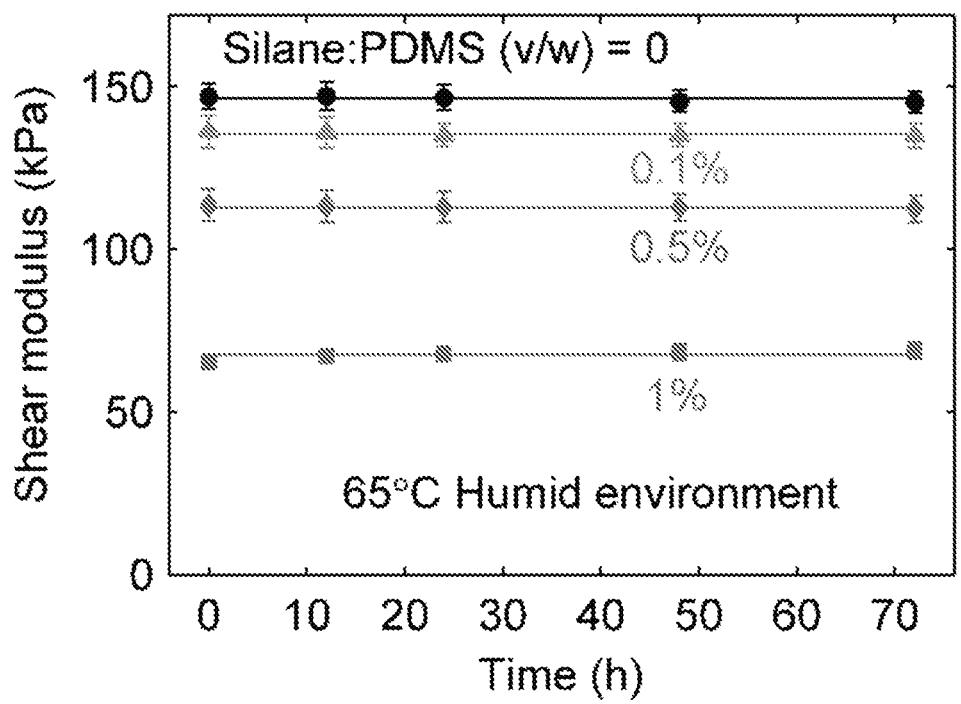

In the PDMS elastomer, the coupling agents react with the conventional crosslinker polymethylhydrosiloxane (Eq. 3). The coupling agents compete with the conventional crosslinking process and lower the modulus of the network. Thus, the modulus of the PDMS elastomer does not change with time, but decreases as the amount of coupling agent increases, as shown in FIG. 3C. However, since PDMS is hydrophobic, the coupling agents rarely hydrolyze and condense. The coupling agents are quite stable in the polymer network, as no change in the modulus of the PDMS at room temperature a month after curing, and no change for samples at 65° C. in a humid environment for three days were observed. FIG. 3D shows a plot of modulus vs. time for PDMS with different amount of TEOVS is sealed in a petri dish with drops of DI water and kept at 65° C. in an oven. The modulus does not change over time (n=3).

In one or more embodiments, it is possible to tune stiffness and adhesion separately since stiffness may be tuned by both the coupling agent and the conventional crosslinkers while adhesion is solely controlled by the coupling agent.

The inter-network condensation of the coupling agents generates bonding. The coupling agents in the hydrogel side readily hydrolyze and condense, but the coupling agents inside the PDMS do not. The different hydrolysis kinetics across the interface impedes bonding. In the limiting case, no bonding is possible if all the coupling agents in the hydrogel have condensed before one single coupling agent in the elastomer has hydrolyzed.

One way to improve the bonding is to add more coupling agents to the precursor of PDMS. Another way is to accelerate the hydrolysis and condensation of the trialkoxysilane in the elastomer by the tin-based catalyst.

Yet another way to improve the bonding is to add a surfactant to the precursor of the hydrogel. The pre-hydrolysis coupling agent on the elastomer chains is hydrophobic, and is difficult to stick into the hydrogel. Addition of a surfactant can reduce the amount of coupling agent needed to affect the desired reaction and/or reduce the reaction time. FIGS. 4A-4C illustrate the use of a surfactant in the method according to one or more embodiments. FIG. 4A is a close-up schematic illustration of silane coupling agents in a polymer system including a hydrogel polymer network and an elastomeric polymer system. Because the silanes are not hydrolyzed the elastomer, the alkoxylated silanes can be considered hydrophobic and therefore do not interact well at the interface with the more hydrophilic hydrogel. In FIG. 4B, a surfactant added to the hydrogel polymer network adsorbs at the hydrogel-elastomer interface, and helps coupling agent on the elastomer chains get solvated and hydrolyzed. In one or more embodiments, the surfactant concentration is maintained below the micelle concentration, e.g., the concentration at which the surfactant aggregates to form micelles. When too much surfactant is added into the hydrogel, the surfactant-polymer complex can also interact with the relatively hydrophobic coupling agent, which slows down the condensation reaction, as shown in FIG. 4C.

Figure 5:
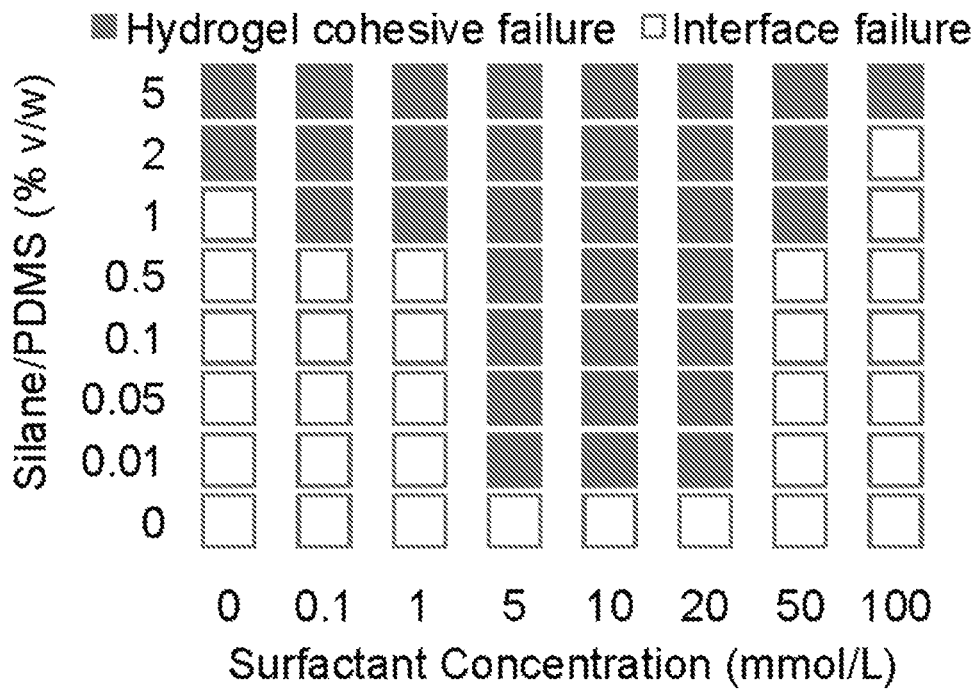
FIG. 5 is a plot showing how surfactant may improve the efficiency of silane coupling agent in bonding PAAm hydrogel with PDMS.

The effect of surface on interfacial bonding is demonstrated by assessing bonding with varying amounts of surfactant. The amount of coupling agent in the hydrogel is held constant and the amount of coupling agent added to the elastomer and the amount of surfactant added to the hydrogel is varied. For each sample, a peeling test is performed after one day of contact. Bonding is considered successful if fracture occurs in the hydrogel instead of on the interface. FIG. 5 is a plot of silane coupling agent concentration with surfactant concentration. Coupling agent/surfactant combinations shown as solid squares demonstrated cohesive failure (in the hydrogel), while coupling agent/surfactant combinations shown as open squares failed at the interface. As the amount of added surfactant is varied, the coupling efficiency first increases then decreases. Adding a suitable amount of surfactant sodium dodecyl sulfate (SDS) to the PAAm precursor (here, between 1-50 mmol/L or more specifically between 5-20 mmol/L), reduces the required amount of coupling agent in the PDMS by two orders of magnitude. Above certain concentrations, the surfactant aggregates with the polymer chain of the hydrogel. Such aggregation hides the silanol groups in the hydrogel, and inhibits adhesion.

Figure 6:
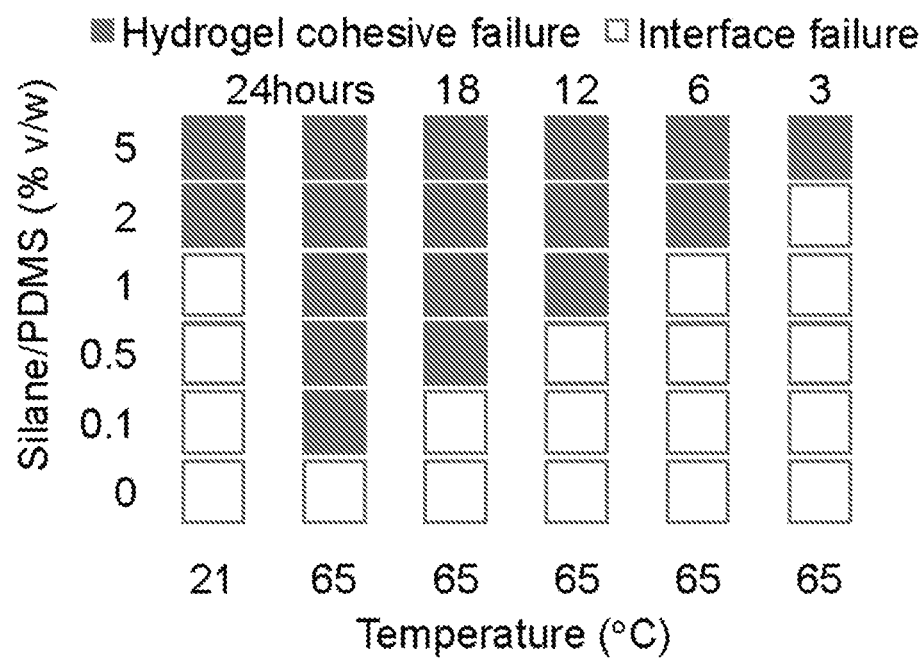
FIG. 6 is a plot showing how curing time at elevated temperature improve the efficiency of silane coupling agent in bonding PAAm hydrogel with PDMS; surfactant concentration was at 10 mmol/L.

In embodiments instances, the fourth way to promote bonding is to use elevated temperature. Additional thermal energy accelerates all the reactions. Consequently, within the same amount of time, more trialkoxysilanes on PDMS near the interface hydrolyze and condense with the trialkoxysilanes on PAAm. At 65° C., the required amount of coupling agent in PDMS reduces by one order of magnitude, as shown in FIG. 6, where coupling agent/surfactant combinations shown as solid squares demonstrated cohesive failure (in the hydrogel), while coupling agent/surfactant combinations shown as open squares failed at the interface.

Additionally, heating significantly reduces the time required for bonding.

In still other instances, the coupling reaction can be triggered by an external stimulus, such as ultraviolet energy.

In one or more embodiments, the polymer networks can be modified to toughen one or both of the polymer networks. Achieving high fracture energy requires the synergy of strong and weak bonds. Fracture breaks not only one layer of strong bonds, but also breaks many more weak bonds, greatly amplifying the measured fracture energy. By way of example, a secondary polymer network can be introduced into the hydrogel layer, whose network is made up of weaker interactions, e.g., ionic crosslinks instead of covalent crosslinks.

A gel can be made tough and notch-insensitive by introducing energy-dissipating mechanisms. For example, a fracture energy of ~10,000 J m$^{-2}$ is achieved with a double-network gel, in which one network is physically cross-linked via electrostatic interactions and the other network is chemically cross-linked via covalent bonds respectively. Further details on the preparation of elastomeric hydrogels can be found in "Highly stretchable and tough hydrogels" Sun et al. Nature (489) 133 (Sep. 6, 2012), which is incorporated by reference.

Figure 7A:
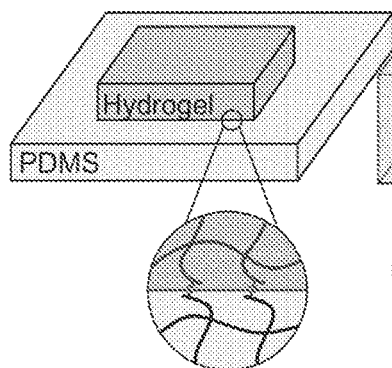
FIGS. 7A-7E show a series of schematic illustrations demonstrating the toughening of a silane modified PAAm-PDMS by infusing a dissipative interpenetrating network according to one or more embodiments.
Figure 7B:
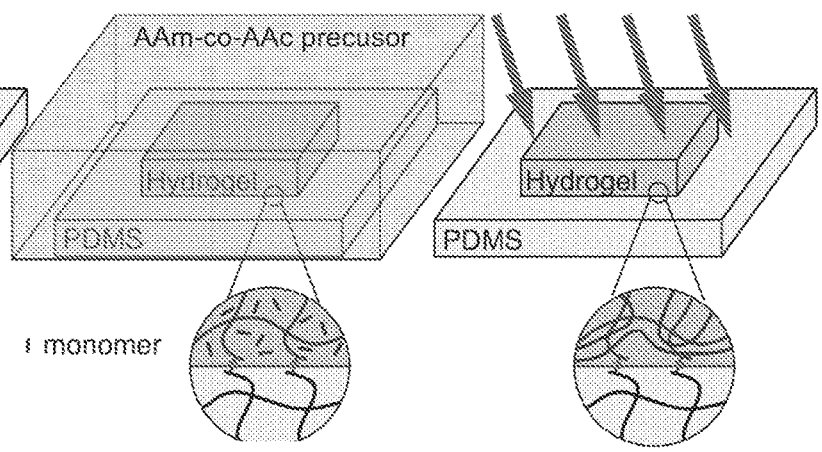
Figure 7C:
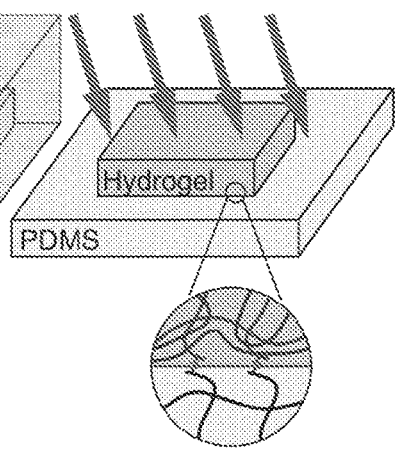
Figure 7D:
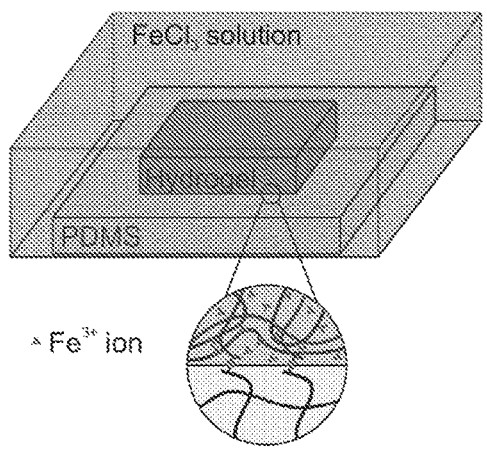
Figure 7E:
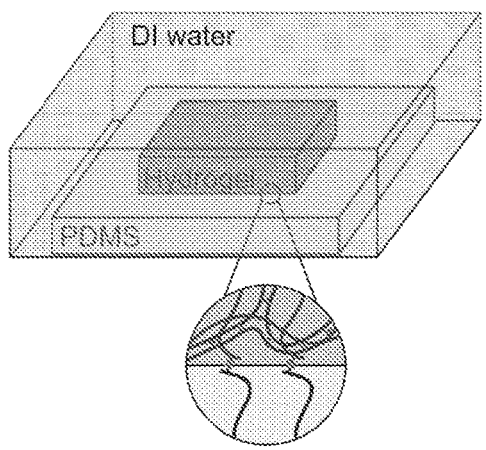

In an exemplary embodiment, the PAAm layer of a siloxane bonded PAAm-PDMS bilayer can be infused with a precursor that forms copolymers of acrylamide and acrylic acid. The bilayer then is immersed in an aqueous solution of $FeCl_3$ to form coordination complexes of $Fe^{3+}$ ions and carboxylic groups. FIGS. 7A-7E provide a schematic illustration of the process. In FIG. 7A, a silane-modified PDMS precursor is spin-coated on a glass slide, and silane-modified PAAm hydrogel is bonded on the silane-modified PDMS, according to the methods described herein. In FIG. 7B, the bilayer is immersed in the precursor of the PAAm-co-PAAc hydrogel for one day, and the infuses into the hydrogel layer. Next, as shown in FIG. 7C, the precursor is polymerized under a UV lamp, but does not crosslink at this stage. Crosslinking is achieved by immersing the sample in $FeCl_3$ solution for one day. The $Fe^{3+}$ ions form coordinate compounds with the carboxylic acid groups, which physically crosslinks the PAAm-co-PAAc network, as shown in FIG. 7D. The siloxane bonds between the PAAm and PDMS chains are strong bonds, and the coordination complexes are weak bonds. The hydrogel becomes brownish after the crosslinking. Finally, the sample is then immersed in distilled water for one day to remove excess $Fe^{3+}$ ions, as shown in FIG. 7E.

The siloxane bonds between the PAAm and PDMS chains are strong bonds, and the coordination complexes are the weak bonds. The peeling test of the toughened PAAm on PDMS gives an adhesion energy of 866.9 J/m$^2$, which is shown as the top curve in FIG. 19A. Still, fracture happens in the hydrogel instead of on the interface.

In one or more embodiments, oxygen-tolerant hydrogel resins can be used in the bonding process. The oxygen-tolerant resins are useful in bioengineering, optics, and soft ionic devices.

Figure 8A:
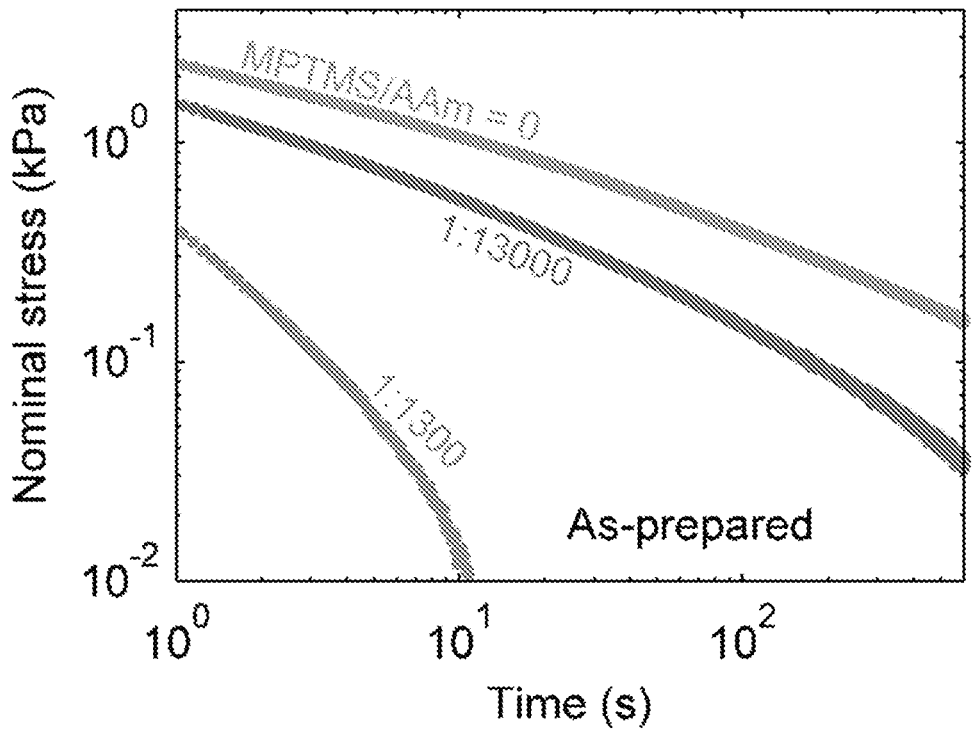
FIGS. 8A and 8B show stress relaxation curves for oxygen-tolerant hydrogel resins (A) before and (B) after condensation of the silane coupling agents.

In one or more embodiments, trialkoxysilanes are used to formulate oxygen-tolerant hydrogel resins. A silane modified PAAm precursor is prepared as described before, but the conventional crosslinker MBAA is removed. The precursor is polymerized in a sealed container. The precursor becomes a viscous fluid right after curing, and its viscosity can be tuned using a chain transfer agent, 3-(Mercaptopropyl) trimethoxysilane (MPTMS). FIG. 8A shows stress relaxation curves for PAAm hydrogels with increasing levels of chain transfer agent MPTMS. The average chain length of the hydrogel polymer decreases with increasing chain transfer agent, according to the reaction sequence in Eqs. 5 and 6.

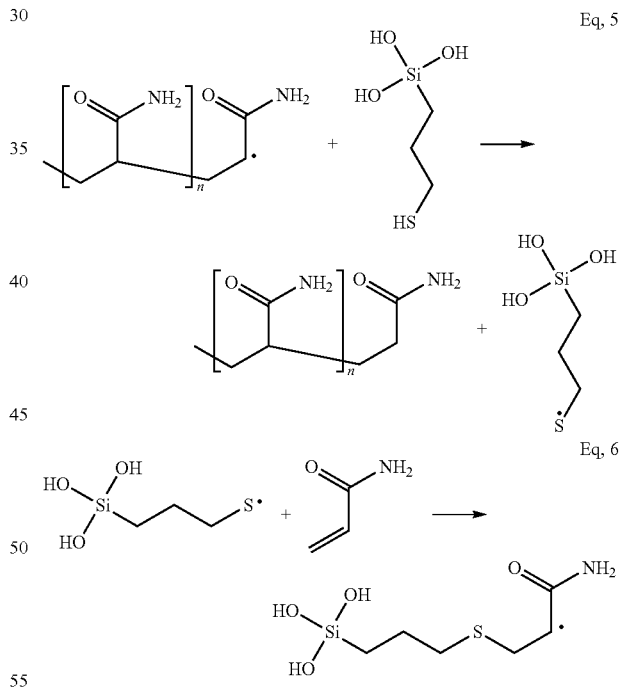

During the polymerization, chain transfer from a PAAm radical to the thiol group of a hydrolyzed MPTMS ends the propagating PAAm chain and generate a thiol radical (Eq. 5). The thiol radical re-initiates a PAAm chain. In combination, each MPTMS cuts a propagating PAAm chain into two. As the average chain becomes shorter, the hydrogel resin becomes less viscous. The silanol groups on MPTMS at each chain end participate in the crosslinking through the condensation with other silanol groups. Stress relaxation tests show that as chain length decreases, the stress relaxation becomes faster.

To conduct the stress relaxation test of the oxygen-tolerant hydrogel resin, the oxygen-tolerant hydrogel resins are prepared as described. The resins are polymerized in syringes of 18.8 mm inner diameter. The syringe is then cut open to take the sample out. The resins are cut into disk shape of roughly 18 mm thickness and put on the Instron machine. A pre-load of 0.02 N is applied to guarantee the contact between the sample and the load cell. The sample is then compressed to 50% its original height at a loading rate of 18 mm/s. The stress relaxation is then measured for 10 min.

Subsequently, the coupling agents condense, crosslinking the polymer into a network. After 12 hours at 65° C., the polymers are crosslinked into a network by the condensation of silanol groups, forming bonds with neighboring silane-modified materials. Consequently, the sample can hold stress without relaxing, as demonstrated in FIG. 8B. The condensation is oxygen-tolerant. Oxygen tolerant resin allows uncured PAAm resin and uncured PDMS resin to be layered, cured together, and form robust bonding. Like a hydrogel, the kinetics of condensation in a resin can be tuned by pH and temperature, allowing the pot-life of resins from a few hours to a few days.

Bonding in Various Manufacturing Processes

As noted above, the kinetics of condensation (therefore bonding) can be tuned by changing temperature and pH, as well as by adding surfactants and catalysts. Consequently, the time scale for bonding can be much longer than the time scale for manufacturing (e.g., casting, assembling, printing, and coating). It is this separation in time scales that enables the method according to one or more embodiments to be generally applicable to various manufacturing processes. Since bonding happens after manufacturing. The approach is compatible with high-throughput manufacturing. For example, alternating layers of hydrogels and elastomers can be printed in a short time, and then removed from the printer to cure and bond. The post-printing cure does not occupy the printer and thus does not interfere with high-throughput printing.

First, the approach bonds preformed hydrogel and elastomer networks. A preformed hydrogel network on a preformed elastomer network. A PAAm hydrogel and a PDMS elastomer are separately molded, and then placed in contact with a thin film of paraffin sandwiched in between. After curing, the contact region between the hydrogel and the elastomer forms bonds while the paraffin region does not. The adhesion is strong enough to sustain different types of load, such as the peeling encountered in pneumatic actuator. The bonding also remains intact as a nozzle inflates the hydrogel into a balloon. As compared to existing approaches to bond hydrogels and elastomers using glue, the methods avoid interrupting the manufacturing to apply glue and does not introduce a glue layer between the interfaces.

Second, the approach works for an elastomer network formed on a preformed hydrogel network. In this approach, a thin layer of elastomer is dip-coated over a hydrogel of arbitrary shape, in this case a G-clef shaped hydrogel. The PAAm G-clef is molded, and then dip-coated with a thin layer of PDMS. The PDMS-coated PAAm G-clef then is dyed in a bath. The color is readily washed away in clean water. By comparison, if a naked hydrogel is dyed in the bath, the color cannot be washed away. The elastomer coating retards mass exchange between the hydrogel and the environment, and the bonding survives stretch and rub. No previously existing approach can coat thin layers of elastomers on hydrogels of arbitrary shape.

Figure 9:
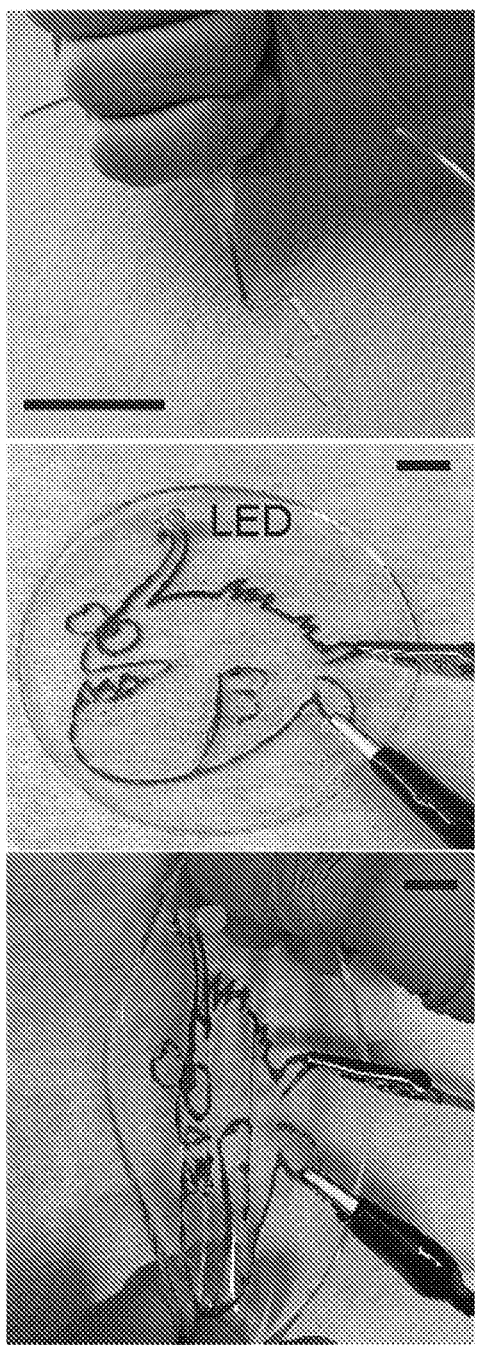
FIG. 9 is a schematic illustration showing the formation of conductive hydrogel lines in the open air using the oxygen-tolerant resin on a preformed elastomer, according to one or more embodiments.

Third, the approach works for a hydrogel network formed on a preformed elastomer network. A hydrogel is a stretchable ionic conductor. A soft ionic circuit can be drawn on an elastomer. The process is illustrated in FIG. 9. A PDMS film is cast first. On the PDMS film, a hydrogel ionic circuit with the shape of an anglerfish is written using a syringe (upper photograph). A light-emitting diode (LED) is switched on (middle photograph). The circuit remains adherent when the elastomer is stretched (lower photograph). As compared to existing approaches using grafting after surface activation, this approach avoids interrupting the manufacturing for surface activation.

Figure 10:
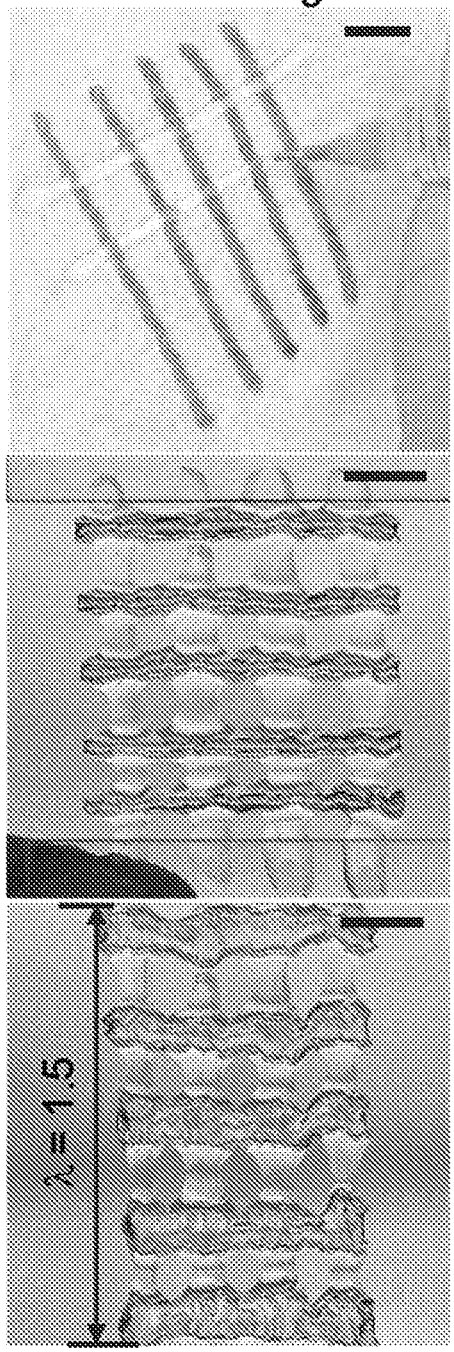
FIG. 10 is a schematic illustration showing the formation of printing hydrogel polymer network and an elastomer polymer network together in the open air using the oxygen-tolerant resin, according to one or more embodiments.

Fourth, the approach bonds two networks that are formed concurrently. Printing of hydrogel-elastomer composite requires dissimilar networks to be formed on top of each other in alternating sequence. As a proof-of-concept demonstration, a PAAm-PDMS mesh is syringe-printed. The process is illustrated in FIG. 10. A silane-modified PAAm hydrogel resin is colored with a blue dye and extruded on a Petri dish. Partially cured PDMS resin is then extruded into lines perpendicular to the hydrogel lines. After curing, the mesh withstands stretching. The scale bars represent 10 mm. In principle, the crosslinking reaction of the polymer network can be much faster than the bonding reaction, and the rheological properties of the ink can be modified by long chain polymers or filler particles. Better printing resolution can be achieved by tuning the crosslinking kinetics and the rheological properties. As compared to existing approaches using copolymerization that prints multilayers of hydrogels and elastomers, copolymerization is only applied to acrylate based hydrogels and elastomers.

The methods according to one or more embodiments allow printing and polymerizing of various hydrogels and elastomers in arbitrary sequences.

Figure 11:
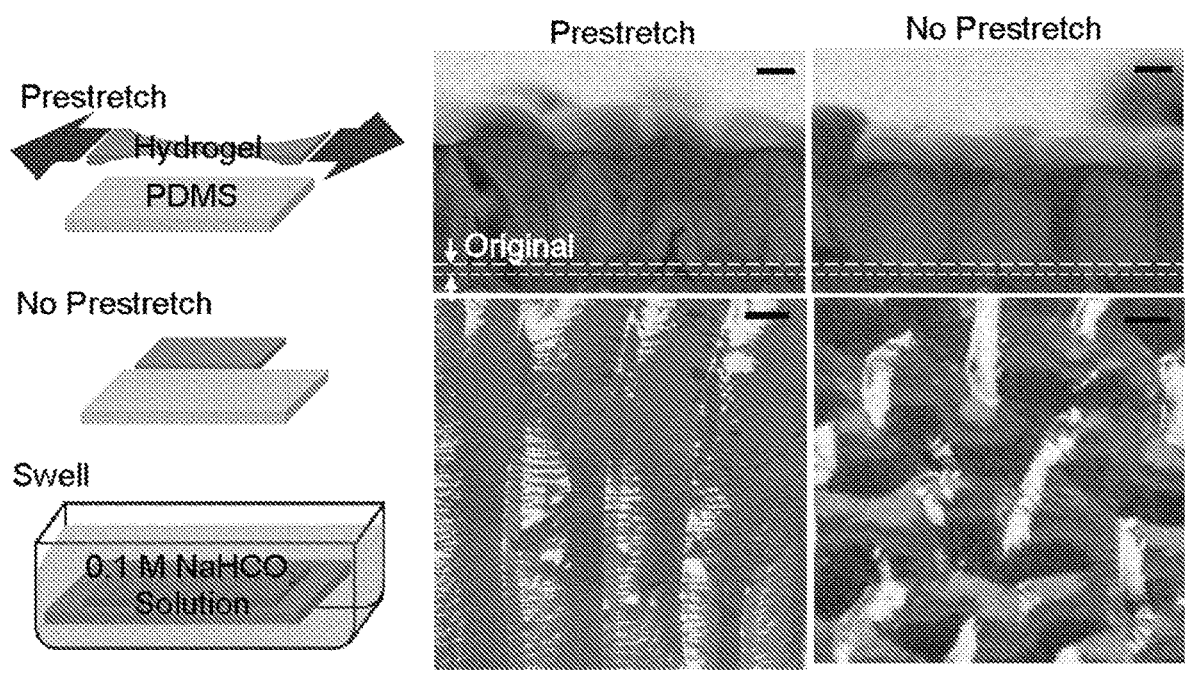
FIG. 11 is a schematic illustration showing mechanical manipulation of the polymer networks during bonding by stretching, and the ability to produced aligned swelling patterns on swelling of the hydrogel.

In one or more embodiments, the method also allows mechanical manipulations during the bonding and manufacturing processes. pH-responsive hydrogel can be pre-stretched before bonding to a PDMS substrate, resulting in aligned swelling patterns. As illustrated in FIG. 11, silane-modified polyacrylic acid (PAAc) hydrogel, with or without prestretch, is bonded to a silane modified PDMS. Upon immersing the bilayer in a 0.1 M NaHCO3 solution, the PAAc hydrogel swells to ~9 times the original thickness. The pH-responsive hydrogels are swollen to ~9 times their original thickness, with no debonding observed. The swelling causes the hydrogel with prestretch to form a one-dimensional pattern, and causes the hydrogel without prestretch to form a two-dimensional pattern. The scale bar is 2 mm.

With resins of suitable rheological properties, elastomers and hydrogels can be integrated like pastries of alternating layers of oil and flour. This concept was demonstrated with two primitive examples: co-drawing of a PDMS coated PAAm fiber (FIGS. 12A-12C), and co-pressing of a multi-layered PAAm-PDMS structure (FIGS. 13A-13B).

Figure 12A:
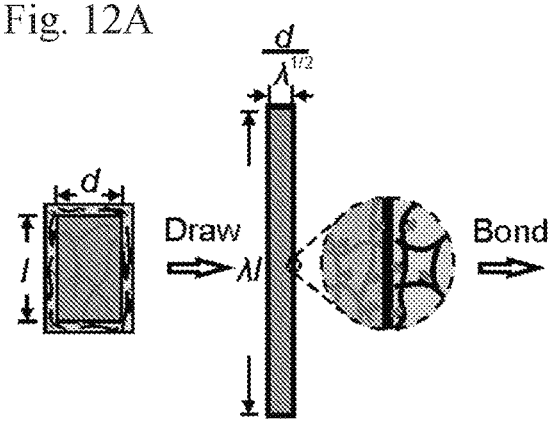
FIGS. 12A-12C demonstrate the co-drawing of a PDMS coated PAAm fiber, according to one or more embodiments.
Figure 12B:
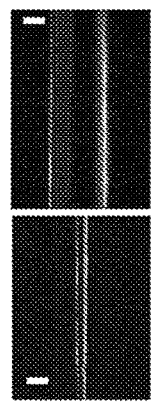
Figure 12C:

FIG. 12A is a schematic illustration of the co-drawing of a PAAm fiber and a PDMS coating. A fiber of oxygen-tolerant resin is dip-coated in a PDMS precursor. Both polymers are uncrosslinked, and are co-drawn into a thinner fiber. Subsequently, the coupling agents condense to crosslink the networks and bond them. Subject to a uniaxial stretch $\lambda$, the hydrogel fiber length increases by a factor of $\lambda$, while the diameter reduces by a factor of $1/\lambda^{1/2}$. FIG. 12B includes digital images (top) and microscopic images (bottom) of the elastomer-coated hydrogel fiber. The fiber has initial diameter ~1.4 mm, and is drawn to a fiber of diameter 154 µm. The scale bar is 500 µm. FIG. 12C shows SEM images showing the cross sections of a PDMS-coated PAAm fiber. The scale bars are 20 µm (up) and 1 µm (down).

Figure 13A:
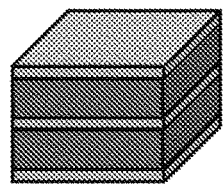
FIGS. 13A-13B demonstrate the co-pressing of a multi-layered PAAm-PDMS structure, according to one or more embodiments.
Figure 13B:
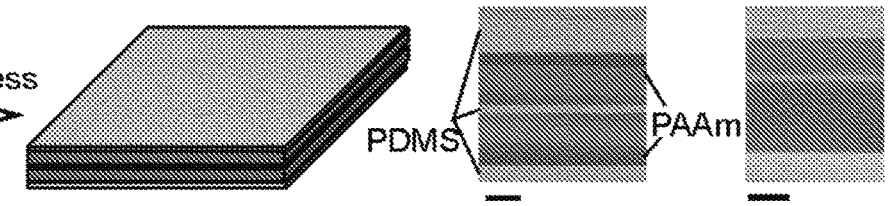

FIG. 13A is a schematic illustration of the co-pressing of multiple PAAm and PDMS layers. Two layers of PAAm resins are dip coated with PDMS coatings, and stacked together, keeping both polymers uncrosslinked. The stacked layers are then pressed into a thinner laminate. After curing, PDMS forms an insulating layer between two PAAm hydrogels, as well as a coating layer covering the surface. FIG. 13B includes images of the cross-section of multilayered PAAm-PDMS structure. The scale bars are 2.5 mm (left) and 250 µm (right).

Heat-Resistant Hydrogels

When a piece of food (i.e., a complex hydrogel) is deep-fried in oil, water vapor bubbles out. Such experience gives an impression that a hydrogel boils above 100° C. An elastomer-coated hydrogel according to one or more embodiments readily survives elevated temperatures without boiling. The heat-resistance of the polymer system was assessed by immersing PAAm hydrogels with or without PDMS coatings in mineral oil heated at 120° C.

A hydrogel boils either from inside or from surface. Boiling from inside needs to overcome capillarity, elasticity and fracture energy. A right combination of the cleanness, stiffness, and toughness of the hydrogel suppress the boiling from inside the hydrogel. In contrast, boiling from the surface only needs to overcome capillarity, but not elasticity or fracture energy. If the surface is clean, the water may be superheated without boiling. If the surface is contaminated with nucleation sites, boiling readily happens above 100° C. Heat resistance of hydrogels is limited by the boiling from surface. No bubbles form inside the hydrogel before bubbles form on the surface of the hydrogel. Boiling from surface can be suppressed by a thin layer of bonded PDMS coating. The coating extends the barrier of elasticity and fracture energy beyond the surface of the hydrogel. The coated hydrogels do not boil with or without surface contamination. Suppressing the formation of bubbles requires strong adhesion between the hydrogel and the elastomer. If the elastomer is not silane modified and therefore does not bond with the hydrogel, vapor bubbles easily nucleate underneath the coating, blow up the coating, and dehydrate the hydrogel.

Figure 14:
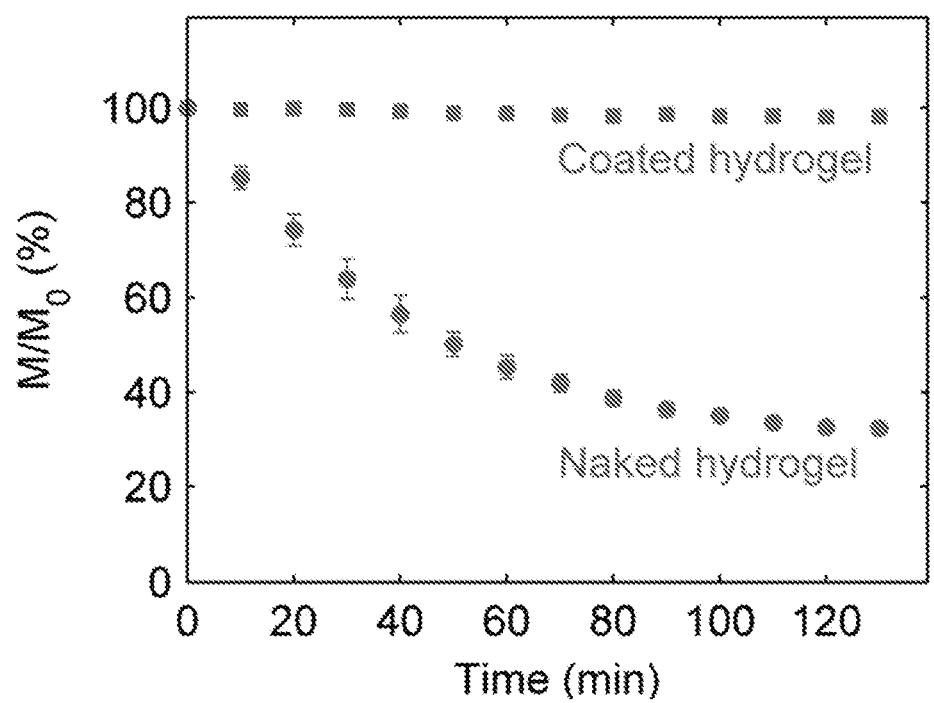
FIG. 14 shows normalized weight loss over time for naked hydrogels and coated hydrogels that were deep-fried at 120° C., demonstrating that the coated hydrogels maintain the weight while the naked hydrogels lost water over frying time. After 130 minutes, the coated hydrogel preserves ~98% of its original weight, while the naked hydrogel decreases to ~33% of its original weight. 33% corresponds to the dry polymer content in the hydrogel.

The weight of a sample as a function of the time of frying is determined. The coated hydrogel maintains ~98% of its original weight after 130 minutes of frying, while the uncoated hydrogel is completed dehydrated, as shown in FIG. 14.

Applications

The myelinated axon is a hybrid of electrolyte and dielectric. The electrolyte is the saline solution inside and outside the axon. The dielectric is the myelin, the fatty sheath of the axon. The electrolyte—dielectric hybrid is a fast conduit for electrical signal, much like a transmission line or an earphone. Recent works have mimicked the myelinated axon using a hydrogel incorporating an ionic salt as the electrolyte and a hydrophobic elastomer as a dielectric. Such a hydrogel-elastomer hybrid, called an artificial axon or an ionic cable, has enabled many devices of unusual characteristics. Examples include stretchable loudspeaker, sensory skin, electroluminescence, and touchpad. Whereas a metal conducts electricity with electrons, a hydrogel conducts electricity with ions. The conductivity of a metal is many orders of magnitude higher than that of a hydrogel. Nonetheless, the hydrogel-elastomer hybrid can transmit electrical signal over long distances (e.g., meters), at high frequencies (e.g., 100 MHz). The hydrogel-elastomer hybrid can be made stretchable, transparent, and biocompatible. Further discussion of the composition of ionic hydrogels is found in WO 2014/169119, the contents of which is incorporated by reference.

Advances in synthesizing tough hydrogels have suggested that the mechanical behavior of the elastomer-hydrogel hybrid can be made similar to that of stretchable fibers in textiles, such as Spandex. Many stretchable conductors have been developed to enable wearable active textiles, but making them washable is challenging. A main hurdle for the elastomer-hydrogel hybrid to function as wearable and washable conductors is the unwanted mass transport, such as the loss of water during wearing and the loss of salt during washing.

Despite the many potential applications of hydrogels as stretchable, transparent, ionic conductors, few commercial devices are available. A stumbling block to transfer the technology to the marketplace is that hydrogels dry out under ambient conditions. Dehydration slows down when the hydrogels are coated with a material of low water permeability.

Approaches to mitigate the loss of water include coating a hydrogel with a hydrophobic elastomer and dissolving a humectant in a hydrogel. Neither approach by itself, however, is sufficient for an artificial axon to be wearable and washable under the conditions common for conventional textiles. For example, a polydimethylsiloxane (PDMS)-coated hydrogel fiber, of a diameter about a millimeter, dehydrates in a few hours in the open air; see Table 2 below. In addition, a humectant-containing hydrogel swells and deswells as the humidity in the air varies. As the hydrogel fiber undergoes volume change, the coating can delaminate.

TABLE 2

Lifetime of Wearable Ionic Textile

| | PDMS 20:1 | VHB 4905 | Butyl Rubber [a,b] |
|---|---|---|---|
| Water-permeability * ($10^{-16}$ m$^2$ · s$^{-1}$ · Pa$^{-1}$) | 2.67 ± 0.13 | 0.400 ± 0.081 | 0.0256 ± 0.0075 [a] <br> 0.0334 ± 0.0061 [b] |
| $\tau_{20\%}$ (days) ** <br> R = 2 mm, <br> h = 1 mm | 4.21 ± 0.21 | 28.1 ± 5.7 | 439 ± 129 [a] <br> 337 ± 62 [b] |
| $\tau_{20\%}$ (days) ** <br> R = 1 mm, <br> h = 100 µm | 0.247 ± 0.012 | 1.65 ± 0.34 | 25.8 ± 7.6 [a] <br> 19.8 ± 3.6 [b] |

* Water-permeabilities have been determined experimentally using a dry-cup setup.
** $\tau_{20\%}$ is calculated for a cylindrical geometry of fiber (radius R and thickness h of coating), for $\Delta\Pi$ = 1.67 kPa ($\Delta$RH = 50%) at 26° C.
[a] Butyl Rubber A.
[b] Butyl Rubber B.

In one aspect, a wearable and washable textile can be made using ionic hydrogel fibers containing a humectant and coated with a low water permeability elastomer. Strong adhesion between the ionic hydrogel fiber and the low water permeability elastomer is achieved using the covalent bonding method described herein above.

In one or more embodiments, a combination of a low water permeable elastomer coating and a humectant is used to make an artificial axon (ionic hydrogel fiber) that is wearable and washable, even when the artificial axon has the diameter of a textile fiber. The dissolved humectant matches the relative humidity (RH) of the hydrogel to the average ambient RH, and the elastomer coating minimizes swelling and deswelling due to daily fluctuation of ambient RH. The permeabilities of the elastomers are unaffected by large deformation. The hydrogel textile fiber can be coated with an elastomer using silane coupling agents to cross-link the elastomer and form strong adhesion between the elastomer and hydrogel. Dehydration in open air and salt transport in an aqueous solution are minimized. The artificial axons can be stretched cyclically in detergent and washed in a washing machine.

Figure 15:
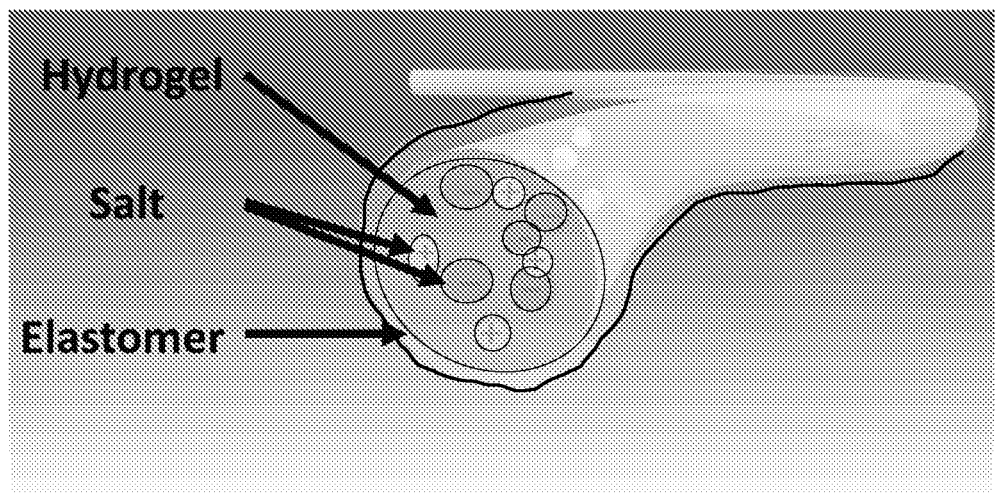
FIG. 15 is a representative design of an ionic hydrogel fiber according to one or more embodiments having a salt dissolved in a hydrogel, and coated with an elastomer.

A schematic illustration of the artificial axon useful in making a washable and wearable textile according to one or more embodiments is shown in FIG. 15. The combined effects of an elastomeric coating as a water permeation barrier and hygroscopic salt in the hydrogel reduce or prevent dehydration of the hydrogel fibers. Many salts are excellent humectants, and their aqueous solutions have relative humidities well below 100%. Thus, in the artificial axon, a hygroscopic salt serves dual functions: ionic conduction and water retention. While neither an elastomeric coating nor a humectant by itself is sufficient for an artificial axon to be wearable and washable, the combination of an elastomeric coating and a hygroscopic salt makes an artificial axon wearable and washable.

The durability the artificial axon to dehydration and washing depends on the type of the elastomer, the radius of the hydrogel R, the thickness of the elastomeric coating h, as well as the tolerable amount of loss of water.

Water permeabilities of elastomers vary more than three orders of magnitude. Butyl rubber has a low water permeability and is particularly suited for this application. Butyl rubber (copolymer of isobutylene with a small fraction of isoprene) is by one order of magnitude less permeable to small molecules than other elastomers. Butyl rubbers have long been used to make inner linings of tires, medical gloves, and drug-eluting stents. Recently, butyl rubbers have been used as hermetic seals for stretchable electronics. However, elastomers demonstrating similar low water permeability also can be used. Despite its relatively low permeability, butyl rubber alone is still too permeable to prevent dehydration of hydrogels at the scale of a typical textile fiber; see Table 2.

Permeability of elastomers to many small molecules has been extensively studied, but data for water permeability are less extensive The water permeability of elastomers was measured using a dry-cup setup and it was observed that the mass of a cup increased linearly with time, indicating that steady-state diffusion was reached at short times (less than 24 h). Butyl rubber is approximately 10 times less permeable than VHB, and about 100 times less permeable to water than PDMS. Recent works on hydrogel-elastomer hybrids often use VHB and PDMS as coatings. Using butyl rubber will increase the lifetime of hydrogel-elastomer hybrids in ambient air. Butyl rubber is also an excellent diffusion barrier against other small molecules and it limits the intrusion of contaminants inside the device. So far as retarding mass transport is concerned, butyl rubber (and elastomers exhibiting similar low water permeability) is the material of choice for stretchable devices.

Figure 16A:
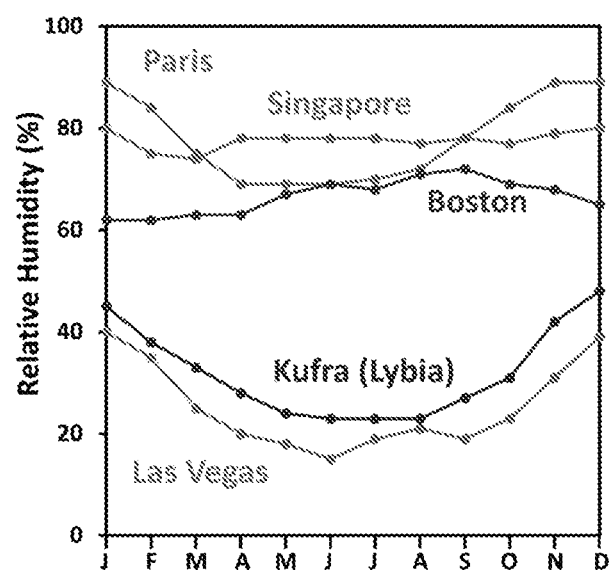
FIG. 16A is a plot showing the monthly variation of atmospheric relative humidity in several cities around the world.

Any hygroscopic salt having a humectant effect can be used. Exemplary hygroscopic salts include lithium chloride (LiCl), magnesium chloride ($MgCl_2$), sodium chloride (NaCl), sodium hydroxide (NaOH), potassium chloride (KCl) calcium chloride ($CaCl_2$), sodium iodide (NaI), potassium acetate ($CH_3COOK$). LiCl is a particularly suitable salt because it has a strong effect on relative humidity, even as low as 11% RH. This gives flexibility in determining the appropriate amount of salt to use to achieve both desired humectant effect and ionic conductivity. The salt concentration reduces the relative humidity of the hydrogel to a desired level. In one or more embodiments, the salt is present in a concentration that meets the average ambient humidity of a target location. The United States Environmental Protection Agency recommends a RH within the range of 30-50% for home and workplace. Outdoor RH varies from one location to another, with monthly variations, which have small amplitude, and daily variations, which depends mainly on the time of the day and the local weather, as illustrated in FIG. 16A. The daily variation of RH recorded in a laboratory setting in Cambridge, Mass. June-July 2016 is shown in FIG. 16B.

The effect of the combined elastomeric coating and hygroscopic salt on dehydration is demonstrated in FIG. 17. An PAAm is coated with a 0.5 mm thick PDMS coating, with and without salt (8 M LiCl). The mass of several hydrogel-elastomer hybrids was measured over many days. The hydrogel with no coating and no salts dries rapidly. When the same hydrogel is coated with PDMS (0.5 mm), the dehydration slows down, but drying still occurs. When a hydrogel contains a humectant (LiCl 8M), variations of its mass become correlated to the variations of ambient RH in the lab. The gel does not completely dry but rather swells and deswells as the humidity in the ambient changes. The mass variations are quick with large amplitude. The combined effects (8 M of LiCl and 0.5 mm of PDMS) level those variations and prevents the complete drying of the gel over long time scales. The gel with both salt and coating no longer dries, and the large variations in environmental RH do not generate large variations in mass.

The actual water permeability required of the elastomer can vary dependent of the ambient conditions and the size of the textile fiber. If the RH of a salt-containing hydrogel matches that in the ambient, then there is no driving force for the hydrogel to lose or gain water. Thus, the choice of the humectant (type and concentration) depends on the average RH in the ambient air. For any geometry of device, the surface-to-volume ratio is inversely proportional to the characteristic length scale. Smaller hydrogel-elastomer hybrids will have higher water evaporation rates relative to their water content. Thus, larger fibers (radius larger than a millimeter) may use elastomers having a higher water permeability than smaller fibers (submillimetric radius). A thicker coating can be used where lower water permeability is desired. In embodiments, where a high level of salt is used (very low RH) and/or it is not required for the hydrogel to be washable, a thinner coating may be sufficient.

Figure 18:
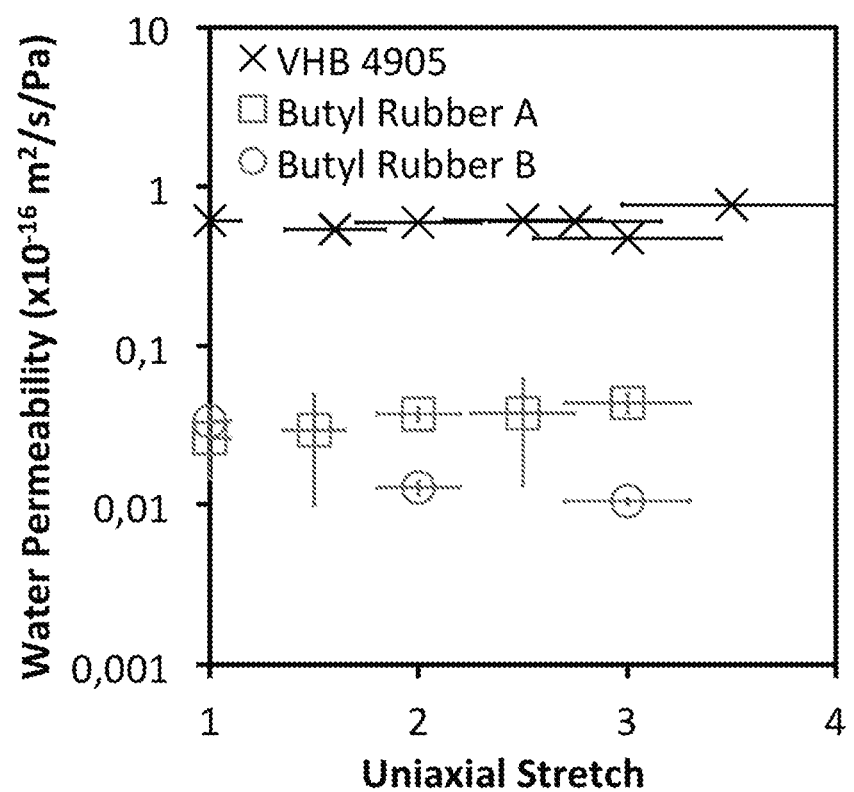
FIG. 18 is a plot showing the effect of stretching on the water permeability of selected elastomers.

Permeability is essentially independent of large deformation. As applications such as stretchable electronics and soft robots require hermetic seals under large deformations, the changes in water permeability when elastomers are stretched is also of interest. When a thin sheet of elastomer is undergoing in-plane stretching, its thickness is reduced because of incompressibility. For an in-plane uniaxial stretch $\lambda$, the thickness is reduced by a factor $\lambda^{1/2}$, which will increase the evaporation rate by the same factor. Taking into account the thickness reduction, the water permeability of VHB and butyl rubber thin films were measured under uniaxial stretch as reported in FIG. 18. Rectangular elastomer thin films were first clamped on two opposite sides between acrylic sheets in order to apply manually the uniaxial stretch in this direction. Then the films were glued on top of cups containing desiccant. A scale (1 cm) was drawn with a marker in the middle of the thin film before stretching, in order to determine the final uniaxial stretch applied. The dimensions of the thin films were at least three times larger than the cup opening. Accordingly, the stretch can be considered to be uniform in the middle of the film. Mass variations of the cups with time were measured using the dry-cup setup. This is the first time that data of this type are reported. The water permeability is essentially unaffected by the stretch λ. Entropic elasticity and diffusion of small molecules are, as a first-order approximation, two independent properties of elastomers. Entropic elasticity is a property of long-chain molecules, while diffusion of small species is related to local vibration of monomers. The two phenomena are related to different length scales and should not be strongly correlated. Elastomers can be used as barrier materials under large deformations.

Elastomer-coated hydrogel fibers. The lifetime of a cylindrical hydrogel fiber (radius R) coated with butyl rubber (thickness h) can be calculated from the water-permeability measurements. A characteristic time of diffusion is $$\tau_{diff} = \frac{h^2}{D} \quad (1)$$

where D is the diffusion coefficient of water in butyl rubber and h is its thickness. An estimate by molecular dynamics simulations gives $D=1.59 \cdot 10^{-11}$ m$^2$/s. A typical value of h for a textile fiber coating is 100 μm, which gives $\tau_{diff}=10.5$ minutes. The diffusion time is much smaller than the timescale over which the ambient relative humidity is varying (a few hours for a change in weather, or 12 hours for a day-night cycle). Consequently, evaporation of water will reach a steady state in typical ambient conditions. Experimentally, the rapid establishment of a steady state was observed by noticing constant evaporation rates on a timescale much smaller than 12 hours.

The lifetime needed for an artificial axon depends on the type of the elastomer, the radius of the hydrogel R, the thickness of the elastomeric coating h, as well as the tolerable amount of loss of water. To compare materials and sizes the time needed to lose 20% of the initial amount of water, $\tau_{20\%}$ was selected as a standard. It can further be assumed that the difference in partial pressure of water between the hydrogel and the ambient is constant, ΔΠ. Using the steady-state diffusion equation for the cylindrical geometry, $$\tau_{20\%} = 0.1 \frac{R^2 \ln(1+h/R)}{P\Delta\Pi} \quad (2)$$

where P is the water permeability, which is the product of the water diffusivity and solubility in the elastomer. For fixed values of h/R, P and ΔΠ, $\tau_{20\%}$ is quadratic in the radius of the fiber. In the thin-coating limit, h/R≪1, ln(1++h/R)≈h/R, so that $\tau_{20\%}=0.1Rh/(P\Delta\Pi)$.

Note that $\Delta\Pi=\Pi_{eq}\Delta RH$, where ΔRH is the difference in the relative humidity between the hydrogel and the ambient, and $\Pi_{eq}$ is the saturated water vapor pressure at a given temperature. Values of $\tau_{20\%}$ in typical ambient conditions (ΔRH=50% and $\Pi_{eq}$=3340 Pa) are given in Table 2 for PDMS, VHB and butyl rubber, and for two different sizes of fibers. For R=2 mm and h=1 mm, $\tau_{20\%}$ is about a few days for PDMS, one month for VHB, and one year for butyl rubber. PDMS is too permeable to function as a diffusion barrier for textile-like applications, because daily variations of relative humidity can be large. VHB and butyl rubber can be used to create a water-retaining hybrid over long times, because the average monthly relative humidity varies modestly from month to month. However, R=2 mm and h=1 mm are unrealistic values for typical textile-like fibers. For R=1 mm and h=100 μm, butyl rubber has a characteristic lifetime $\tau_{20\%}$ longer than a few weeks. Under these conditions, butyl rubber has a low enough permeability for textile-like applications.

Butyl-coated, salt-containing hydrogel fibers. Butyl rubber can limit mass variations of textile-like fibers over a few weeks, under a large and constant difference in the relative humidity between the hydrogel and the ambient, ΔRH=50%. To avoid losing and gaining water over years, the relative humidity inside the hydrogel can match the annual average relative humidity in the ambient. The annual average relative humidity varies from one location to another, but variations at a location around this annual average are narrowed to 20-30%. The relation between salt concentration and relative humidity of electrolyte solutions is well known and it can be chosen depending on the place of use. Salts like LiCl and MgCl can reduce the internal relative humidity of the gel down to 11% and 33%, respectively. These values are low enough to match the average ambient relative humidity in most places around the world. The driving force of permeation can be—on average—cancelled by this hygroscopic effect, and the relative variations of mass leveled by the butyl rubber. So far as dehydration is concerned, butyl-coated, salt-containing hydrogels of scales of textile fibers can have infinite lifetime.

In one or more embodiments, a wearable ionic textile is made of an inner fiber of hydrogel containing salt and an outer layer of a butyl rubber. This configuration of elastomer-hydrogel hybrid is for demonstration purposes only; a range of hydrogel fibers/hygroscopic salts and low water permeability elastomer coatings can be used to prepare a range of products, including washable and wearable textiles. The effect of sealing of the elastomer is expected to be similar for other configurations, such as hydrogel-elastomer laminates, and ionic cables containing two hydrogel wires.

In one or more embodiments, the elastomer-hydrogel hybrid is processed to form strong adhesion between the two materials. The butyl rubber is dip-coated into a preformed hydrogel fiber. Coupling agents in the two polymer networks crosslink to form covalent bonds and a strong adhesive coating. In one or more embodiment, the hydrogel can include a trialkoxysilane as the coupling agent, and can be shaped into a fiber and cured to the hydrogel polymer network, giving is sufficient strength for the subsequent dip-coating operation. The butyl rubber system also includes a trialkylsiloxane coupling agent. It possible to simultaneously crosslink and bond the butyl rubber coating upon dipcoating. As a result, transparent, soft and stretchable, hydrogel fibers coated with butyl rubber can be prepared. Dip coating and bonding hydrophobic rubbers to hydrophilic hydrogels is possible, and it will help to solve delamination issues in hydrogel-elastomer hybrids. This process is generic and can be applied to a broad range of hydrogels, elastomers, and geometric configurations.

Embodiments of the current disclosure are described in the following examples, which are presented for the purpose of illustration only, and are not intended to be limiting.

Example 1

Comparative Example Showing Effect of Coupling Agents

Synthesis of silane-modified hydrogels. Acrylamide (AAm, Sigma-Aldrich A8887) was dissolved in distilled water (Poland Spring) to form a solution of concentration 2 M. For every 1 ml of the solution, 4 µl of 0.1 M N,N-methylenebisacrylamide (MBAA, Sigma-Aldrich M7279) was added as the conventional crosslinker, 20 µl of 0.1 M α-ketoglutaric acid (Sigma-Aldrich 75890) was added as the UV initiator. Unless otherwise specified, 1.9 µl of 3-(trimethoxysilyl) propyl methacrylate (TMSPMA, Sigma-Aldrich 440159) was added as the coupling agent. Since prehydrolysis TMSPMA is hydrophobic, the solution was vigorously stirred for 1 minute to disperse, hydrolyze, and dissolve TMSPMA. The α-ketoglutaric acid makes the precursor acidic (pH~3.5), which accelerated the hydrolysis of trialkoxysilane, but slowed down the condensation of silanol groups. 33.3 µl of 0.3 M sodium dodecyl sulfate (SDS, Sigma-Aldrich L3771) was added as surfactant. The solution was then poured into a mold made of laser-cut acrylic sheets (McMaster-Carr). The mold and the solution were covered with the bottom of a petri dish to prevent oxygen inhibition. The covered mold was then placed under a UV lamp (15 W 365 nm; UVP XX-15L, 2 cm distance between sample and lamp) for half an hour to polymerize into the PAAm hydrogel. Polyacrylic acid (PAAc) and Poly(N-isopropylacrylamide) (PNIPAM) were prepared similarly using a 2M solution of the corresponding monomer. The hydrogels were used as prepared so that the water content corresponds to the concentration of the precursor, which was 2M AAm in water, unless otherwise specified.

Synthesis of silane-modified PDMS. The precursor of the PDMS is made by mixing the base and the curing agent of Sylgard 184 (Dow Corning) at 10:1 weight ratio. Unless otherwise specified, 0.1% v/w of triethoxy(vinyl)silane (TEOVS, Sigma-Aldrich 175560) is then mixed into the precursor. The precursor is then left at ambient condition for 30 min for the air bubbles to float out, poured into a petri dish, and cured at 65° C. in an oven (VWR, Model No 1330GM) for 12 hours. Silane-modified Ecoflex 0020 is prepared similarly using 0.3 v/w TEOVS.

Preparation of bilayer. A free-radical polymerized polyacrylamide (PAAm) hydrogel and an addition-cured polydimethylsiloxane (PDMS) elastomer were bonded as described above. Different trialkoxysilanes were mixed into the precursors of the hydrogel and the elastomer, and the two networks were formed separately. The hydrogel precursor used α-ketoglutaric acid as the photo-initiator, giving a pH~3.5. The networks were then placed in contact, sealed the bilayer in a petri dish, and kept at room temperature for one day. Afterwards, the adhesion energy was measured using the 90-degree peeling test.

Measurement of adhesion. Samples of the PAAm hydrogel are prepared with the size of 538×20×3 mm. Samples of the PDMS elastomer are prepared with the size of 90×30×1.2 mm. The hydrogel is put on top of the elastomer right after curing unless otherwise specified. A 20×30 mm paraffin film (Bemis, Parafilm M) is inserted at the hydrogel-elastomer interface at one end. The film prevents the bonding in the corresponding area and serves as a pre-crack. The hydrogel-elastomer bilayer structure is stored at room temperature for 1 day for adhesion to develop. The sample is covered in a petri dish to prevent the hydrogel from dehydration. The hydrogel-Ecoflex bilayer was stored at 65° C. for 1 day before test.

After 1 day in contact, the bilayer is taken out of the petri dish. The elastomer side is bonded to a glass slide (VWR Catalog No. 48382-179) using a cyanoacrylate adhesive (krazy glue). For PDMS, the elastomer side is first bonded to a rubber band (McMaster-Carr, SBR) using silicone adhesive (Smooth-On, Sil-Poxy, 12 min for curing at room temperature) before bonding to the glass slide. The glass slide serves as the rigid substrate during the peeling test. The hydrogel side of the sample is glued to a thin polyester film (50.8 µm; McMaster Carr) using the cyanoacrylate glue. The polyester film serves as a flexible, inextensible backing for the hydrogel. If the hydrogel precursor is acidic, the surface of the hydrogel is first neutralized with a few drops of 0.1M NaHCO3 (Sigma-Aldrich S5761) solution and dried with blowing air before applying the cyanoacrylate glue.

The sample with glass substrate and polyester backing layer is then loaded to a mechanical testing machine (10 N or 500 N load cells; Instron 3342 Single Column UTS) using the 90 degree peeling fixture (Catalog No. 2820-035). The peeling rate is 10 mm/min. The plateau value of the force-displacement curve gives the adhesion energy.

Figure 19A:
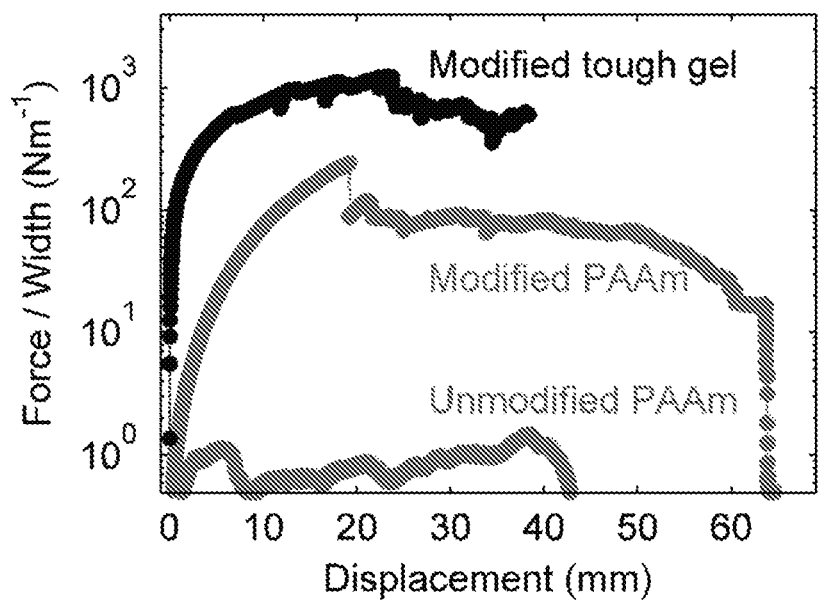
FIG. 19A shows force displacement curves of 90 degree peeling test for silane-modified PDMS substrate bonded with various forms of PAAm: unmodified PAAm (lower), silane-modified PAAm (middle), and silane modified PAAm toughened by an interpenetrating polyacrylate network (upper).
Figure 19B:
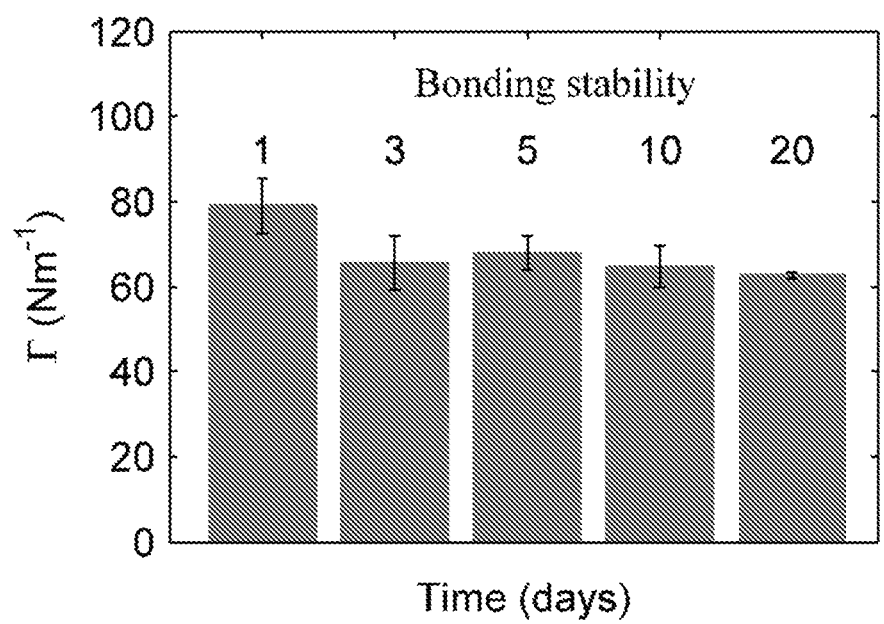
FIG. 19B shows bond strengths for silane-modified PAAm with PDMS over time (n=3-5).
Figure 19C:
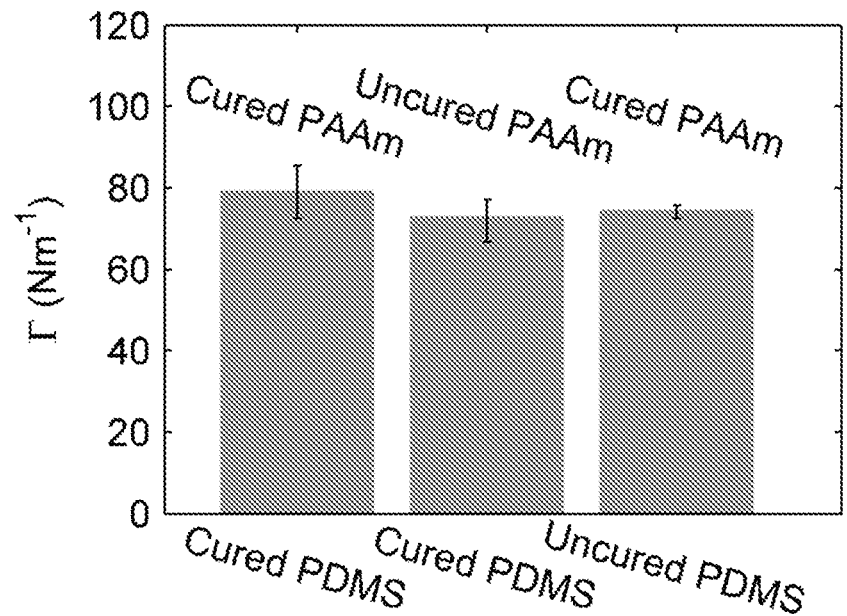
FIG. 19C shows bond strengths for silane-modified PAAm with PDMS achieved using different sequences of network formation (n=3-5).
Figure 19D:
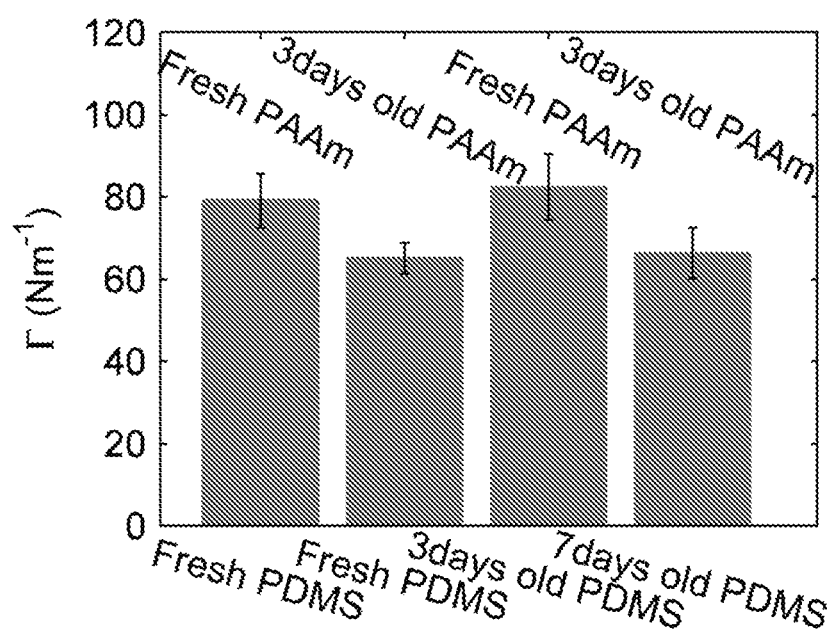
FIG. 19D shows bond strength silane-modified PAAm with PDMS using varying combinations of fresh, 3-day old and 7-day old polymer networks (n=3-5).

Results shown in FIGS. 19A-19D. For unmodified PAAm and PDMS, the hydrogel peels off on the interface and leaves no residue on the elastomer. If the coupling agents were not added, or only added to one precursor, the adhesion energy was low (1.0 J/m$^2$), and the hydrogel peeled on the interface. If the coupling agents were added to both precursors, the adhesion energy was high (80.5 J/m$^2$), and fracture occurred in the hydrogel. For silane-modified PAAm and PDMS, fracture occurs in the hydrogel, leaving residue on the elastomer. FIG. 19A shows force-displacements curves for a silane-modified PDMS substrate bonded with various forms of PAAm: unmodified PAAm (lower curve), silane-modified PAAm (middle curve), and silane modified PAAm toughened by an interpenetrating polyacrylate network (upper curve). The stability of the bonding is confirmed by a series of peeling tests up to three weeks after bonding. The bond interface was stable over several days as shown in FIG. 19B, where the adhesion energy (reported in bar graphs) dropped slightly over the first few days as the coupling agents condensed, but stabilized afterwards (n=3-5). The drop is explained by the increase of crosslinking density of the hydrogel as the coupling agents condense, making the hydrogel stiffer and less tough. See discussion of FIG. 3A.

The order of network formation did not significantly affect bonding strength. Bonding of the PAAM hydrogel to PDMS was conducted using different sequences for forming the polymer networks, e.g., preforming PMMa and PDMS networks before bonding, contacting uncured PMMa to cured PDMS and contacting uncured PDMS to cured PMMa. Bond strengths reported in FIG. 19C show that the bonds have comparable strength. Bonding between different hydrogels is also possible, e.g., between PAAm and polyacrylic acid (PAAc).

In addition, bond strength was not affected by the age of the polymer network, an indication that the unreacted curing agent is stable until activated. Bond strengths for polymers systems using different combinations of fresh, 3-day old and 7-day old PDMS and PMMa networks are reported in FIG. 19D. Comparable bonding was achieved even if the silane-modified samples were a few days old before contact (n=5).

Figure 20:
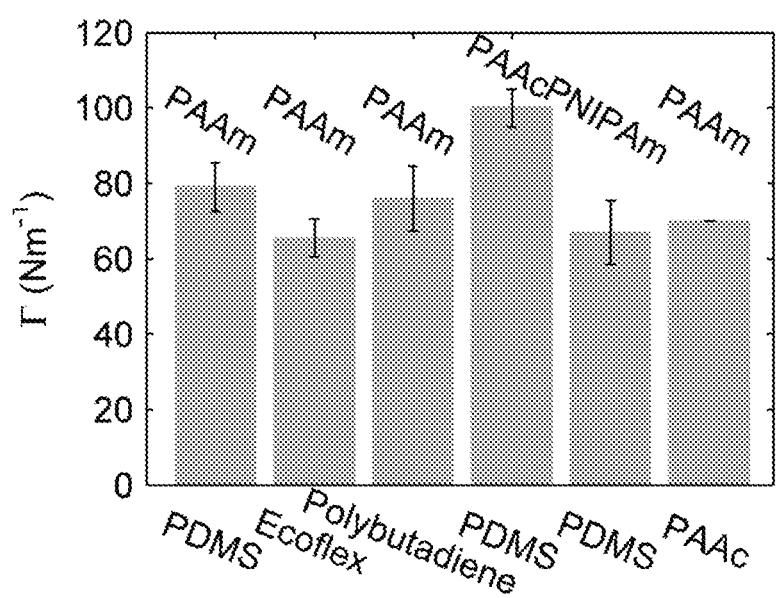
FIG. 20 shows bond strengths for various hydrogels and elastomers combinations (n=3-5).

Similar tests were conducted for PAAm with 2 M NaCl on PDMS, PAAm on polybutadiene, PNIPAM on PDMS, PAAm on Ecoflex, and PAAc on PDMS, and the bond strengths are reported in FIG. 20. In these experiments, the concentrations of the coupling agents in both the hydrogel and the elastomer are about 0.1% vol. Assuming no segregation, the coupling agents are estimated to cover about 1% the area of the interface. The low density of bonds achieving strong adhesion is specific to stretchable networks. The forces in the networks are transmitted through crosslinks, and the bond density between the networks only need to be comparable to the crosslink density in the networks. So little coupling agents are required that the approach consumes much less trialkoxysilanes than a surface treatment to achieve similar adhesion for samples of sizes on the order of 10 cm.

Example 2

Fabrication of a Fe-PAAc-Toughened PAAm on PDMS

The silane-modified PDMS precursor is first spin-coated (Headway Research, PWM32-PS-R790) onto a glass slide (same type as used in other peeling tests) at 1000 rpm for 50 s. Since PDMS is rather permeable to oxygen, a thick layer of PDMS would act as a source of oxygen, and inhibit the curing of the second network in the hydrogel introduced later. The spin-coated thin layer of PDMS avoids this problem. The spin-coated sample is then cured as previously described for other PDMS samples.

The hydrogel is fabricated and bonded to the PDMS as previously described as well. After 1 day of bonding, the sample is immersed in the precursor of the second network in a petri dish, which consists of 1.58 M of AAm, 0.2 M of AAc, and 0.004 M of α-ketoglutaric acid. After one day of immersion, the petri dish with the immersed sample is covered with a polyethylene film (Minigrip, 2 Mil) and polymerized under UV for 2 hours. The polyethylene film prevents the oxygen inhibition of the polymerization. After the curing, the PAAm-co-AAc is not crosslinked. The excess PAAm-co-AAc outside the hydrogel is readily removed by a spatula. The sample is then immersed in a 0.06 M $FeCl_3$ solution for one day. The $Fe^{3+}$ ion diffuse into the hydrogel and crosslinks the second network by forming coordination complex between the $Fe^{3+}$ and the carboxyl groups of the acrylic acid. The hydrogel turns brown after the crosslinking process. The sample is then taken out from the $FeCl_3$ solution and immersed in distilled water for another day. Immersion in distilled water removes excess $Fe^{3+}$ ions from the hydrogel and improves the quality of the crosslinking.

Example 3

Synthesis of Silane-Modified Polybutadiene

10% w/w polybutadiene (Aldrich 181382) is dissolved in hexane (Sigma-Aldrich 34859). 0.1M Benzophenone (Sigma-Aldrich 139386) is dissolved in hexane. For every 10 g polybutadiene, add 9.26 µl 0.1M Benzophenone, 8.6 µl MPTMS and 2.46 µl dibutyltin diacetate (Aldrich 290890). The solution is reacted under UV for 1 hour. The solution is then poured into a petri dish in a fume hood. After the hexane is evaporated, the rubber film is put in contact with a modified hydrogel. Bonding forms after one day.

Example 4

Fabrication of Hydrogel-Elastomer Pneumatic Actuator

A silane-modified PAAm, size 50×40×3 mm, and a silane-modified PDMS, radius 80 mm and thickness 1.2 mm were prepared. The PAAm was then laid onto the PDMS surface, sandwiching a circular film of paraffin, radius 20 mm and thickness 0.05 mm. The PAAm and the PDMS bond around the paraffin after 1 day. Then a nozzle is inserted into the unbonded region between the PAAm and the PDMS. Air is then pumped through the nozzle until the PAAm balloon blows up.

Example 5

Fabrication of a Silane-Modified Polyacrylic Acid (PAAc) Hydrogel on Top of PDMS We fabricate a piece of PAAc following the same procedure as the modified PAAm, by replacing the 2 M acrylamide solution with a 2 M acrylic acid (Sigma-Aldrich 147230) solution. A piece of modified PDMS is prepared as described in the section of "Synthesis of silane-modified PDMS". The modified PAAc is uniaxially stretched to three times its original length and clipped to an acrylic sheet. The modified PDMS is then laid over the prestretched hydrogel. The hydrogel elastomer bilayer is kept in a sealed polyethylene bag (Minigrip) at room temperature for 1 day. The bilayer is then taken off from the acrylic sheet and submerged in 0.1 M solution of NaHCO3 until the hydrogel swells to equilibrium. For comparison, a hydrogel-elastomer hybrid sample without prestretch is prepared following a similar procedure.

Example 6

Fabrication of Dip-Coated G-Clef

A silane modified PAAm hydrogel of the G-clef shape is prepared as before in a laser-cut mold. A Pt-catalyst for the curing of PDMS (Sigma Aldrich 479519) is added into the aforementioned silane modified PDMS precursor at 0.1% v/w to accelerate the curing. The hydrogel G-clef is dipped in the PDMS precursor and hang at room temperature for half an hour to drain the excess PDMS. The G-clef is the dipped in the PDMS precursor for the second time followed by half an hour hanging. The sample is then placed in a petri-dish and sealed. The sample is left at room temperature for 1 day.

Example 7

Ionic Circuit Writing

Tetrahydrofuran (THF, Sigma-Aldrich 360589) is dehydrated with 10% w/v 4 Å molecular sieves (Sigma-Aldrich 208590) for one day. The chain transfer agent (3-Mercaptopropyl)trimethoxysilane (MPTMS, Sigma-Aldrich 175617) is diluted in the dehydrated THF to 1% v/v concentration. Conductive AAm precursor is made of 2 M AAm and 2 M NaCl solution. For every 1 ml 2M AAm/NaCl solution, 10 µl of the 0.1 M Acetic acid (Sigma-Aldrich A6283) is added to lower the pH. 2.85 µl of the 1% MPTMS in THF is then added. Afterwards 1.9 µl TMSPMA is added. The solution is stirred for 1 minute. 2.5 µl of 0.1 M Irgacure 2959 (Sigma-Aldrich 410896) is added as photo-initiator.

The solution is extracted into a plastic syringe (5 ml VWR 309646) with a blunt needle of 1.2 mm diameter. The syringe is placed under previously described UV setup for 30 mins. The syringe seals the precursor from open air and prevents the oxygen inhibition during the polymerization. The syringe is then pressed to extrude the PAAm solution on a modified PDMS (FIG. 10). The PDMS is modified with 2% v/v TEOVS and cured beforehand. Since the high ionic strength in the hydrogel interferes with the function of SDS, high amount of TEOVS is used to achieve bonding without surfactant. After the drawing, the sample is sealed in a petri dish and left at room temperature for 1 day. For the drawing of the angler fish, the sample is flushed with water soluble blue dye (VWR). The sample is then washed with distilled water to remove excess dye. This coloring process reveals the blue pattern. The upper half and the lower haft of the fish have been drawn as disconnected parts. A blue light emitting diode is inserted to connect the two disconnected parts at the head side. The tail side is connected to DC voltage source (Dr. Meter PS-305DM). The light is turned on with 6V DC voltage.

Example 8

Printing of PAAm-PDMS Mesh

The PAAm resin is prepared as described in the last Example. PDMS resin is prepared by mixing every 1 g PDMS (Sylgard 184 base: curing agent=10: 1) with 1 µl Pt-catalyst (Sigma Aldrich 479519) to accelerate the curing. The mixture is extracted into a syringe and precured at 65° C. for 20 min before printing. The resin is printed into a mesh structure.

Example 9

Extrusion of PAAm Hydrogel Fiber

The preparation for the hydrogel resin is identical to the last section except that no MPTMS is not added and a 0.9 mm diameter blunt needle is used instead of the 1.2 mm one. After 30 min UV curing, the syringe (5 ml VWR 309646) is compressed with the Instron machine at fixed speed 5 mm/min. The fiber is collected by wrapping on a polypropylene vial (Falcon 50 mL polypropylene conical tube 30×115 mm style). The fiber is then cut and hung in a sealed container and cured at 65° C. for 12 hours.

Example 10

Co-Drawing of PDMS Coated PAAm Fiber

A PAAm fiber is spinned as described in the section of "Extrusion of PAAm hydrogel fiber". The fiber is directly coated with a silane modified PDMS precursor. The fiber is then stretched and hold in a sealed container at room temperature for one day. The fiber is then examined under optical microscope (Nikon, Me600) and SEM (Zeiss, FESEM ultra 55).

Example 11

Co-Pressing of a Multilayered PAAm-PDMS Structure

Two layers of PAAm resin are prepared with the recipe of ionic circuit. A silane-modified PDMS precursor is prepared as before and is pre-cured at 65° C. for 20 minutes to increase the viscosity. One PAAm resin is placed on the bottom of a petri dish wiped with a layer of PDMS precursor, followed with the wiping of another layer of PDMS on the top. Subsequently, the other PAAm resin is laminated. The multilayer is compressed by the cover of the petri dish with a weight. The final thickness of the multilayer is controlled using two acrylic sheets as the spacers. After pressing, the multilayer is sealed inside a plastic bag, allowing the full curing of PDMS and condensation of silane for one day at room temperature.

Example 12

Deep-Frying Hydrogels

A 35% w/w AAm precursor was used to make the stiff hydrogel. For every 1 ml AAm solution, 200 µl 0.1 M MBAA is used. The resulting PAAm hydrogel has a shear modulus of 64.3 kPa, measured by the tensile test described before. To prepare a PDMS-coated hydrogel, the hydrogel is dipped into the precursor of PDMS for five times. The resulting coating has a thickness of about 300 µm. Both the naked PAAm hydrogels and the PDMS-coated PAAm hydrogels are cured at 650C for 12 hours in a sealed container. A cup of mineral oil (VWR, BDH7338-4) is heated on a hot plate (VWR). A thermal couple is immersed in the oil and connected to the hot plate for the temperature control of the hot plate. A magnet stirrer is used to help homogenize the temperature in the oil. After the temperature of the oil stabilizes at 1200C, the stirrer is stopped. The samples are hung on a steel bar via copper hooks, and fried in the oil for at least 5 minutes. The naked or coated hydrogel is dipped in graphite powder (Sigma-Aldrich, 282863) for dirty samples.

Example 13

Preparation of at Butyl Rubber Coated Hydrogel Fiber

Making hydrogel fibers. Polyacrylamide hydrogel fibers of two types, A and B were made. Hydrogel A was prepared using a common method. Hydrogel B was prepared by a new method to achieve strong adhesion with the butyl rubber; see description in a later section. For either hydrogel A and B, the pre-gel solution was injected into a silicone tubing, placed horizontally in a desiccator with a constant nitrogen flux (and exposed to UV in case of Hydrogel B). The hydrogel cured within a few hours. Then the tube was placed in a dichloromethane solution, the silicone tubing swelled, but the hydrogel fiber did not swell and was readily pulled out of the tubing. The hydrogel fiber was then stored in a saline solution (of the same salt concentration as the pre-gel solution) before further experiments.

Dip coating butyl rubber onto hydrogel fibers. A polyisobutylene solution is cast on the surface of the fiber by dip coating. Dip coating is widely used to make multilayered fibers However, there is no example in the literature of dip coating a hydrophobic coating (butyl rubber) onto a soft and hydrophilic fiber (hydrogel). The pre-solution of butyl rubber was prepared by dissolving long chains of polyisobutylene in a good organic solvent. Two types of butyl rubber, butyl A and butyl B, were prepared. In both cases (hydrogel A-butyl A and hydrogel B-butyl B), dip coating was performed by hand, with an approximate drawing velocity of 1 mm/s. For a single dip coating, the thickness obtained was in the range 20-50 µm for both preparations. Thicker coatings were obtained by repeating dip coating multiple times, by following the same drying procedure for butyl A and B.

Butyl A is a recently developed thermoplastic, in which β-sheet nanocrystals act as the physical crosslinks. Prior to dip-coating, polyisobutylene (PM) chains were dissolved in a solution of chloroform and methanol (PM: $CHCl_3$: MeOH=1 g:10 mL:1 m), by stirring at ambient temperature for 12 hours. Butyl A was dip coated on top of hydrogel A fibers. Upon drying of the organic solvent within 24 to 48 hours, butyl A was automatically crosslinked by the β-sheet nanocrystals. In this case, polyisobutylene and polyacrylamide do not cross link, resulting in poor adhesion between the butyl rubber and the hydrogel by the 90° peeling test using an INSTRON® machine.

Simultaneous crosslinking and bonding of butyl upon dip coating. Achieving strong adhesion between a butyl rubber and a hydrogel is challenging. Most conventional methods to enhance adhesion between soft materials are not applicable. For example, since the precursor of the butyl rubber is in a liquid state before the coating, it is difficult to apply a glue on the interface. Also, since hydrogel consists of more than 80% volume of water, there is no established way to graft elastomer coating onto hydrogel. Furthermore, crosslinking and bonding must be achieved in mild conditions of pressure and temperature, in order to preserve the hydrogel.

An elastomer and a hydrogel can form covalent bonds by adding trialkoxysilanes into their precursors. Upon hydrolysis, a trialkoxysilane generates silanol functional groups, which can condense into covalent O—Si—O bonds. This strategy is used to dip-coat a butyl rubber onto a hydrogel, simultaneously crosslinking the butyl rubber and forming covalent bonds between the butyl rubber and the hydrogel. The schematic for this process is shown in FIGS. 21A-21C.

The polyacrylamide hydrogel B contains two types of crosslinkers: the commonly used MBAA and a trialkoxysilane (TMSPMA) as shown in FIG. 21A. They crosslink over different time scales, enabling two distinct steps of fabrication: forming a hydrogel, and dip coating the hydrogel with a butyl rubber. The precursor of the hydrogel was first buffered to pH=4 to slow down the silane condensation inside the hydrogel. For every 10 mL of AAm solution at 2 M (and salts, typically NaCl at 2 M), 200 µL of α-ketoglutaric acid at 0.1 M, 40 µL of MBAA, and 19 µL of TMSPMA were added in sequence. The precursor was stirred for one minute to dissolve TMSPMA and then added 100 µL of surfactant Brij© L4 at $10^{-3}$M. TMSPMA rapidly hydrolyzed to form silanol functional groups. The surfactant was used to enhance the efficiency of interfacial coupling with hydrophobic materials. Upon curing under UV exposure, in less than one hour, a polyacrylamide network formed, crosslinked by MBAA. The silane coupling agent was incorporated into the polyacrylamide network. The polyacrylamide network gives the hydrogel a solid form to be handled during dip coating. The dangling silanol functional groups condense with one another over the course of about three days. Hydrogel B fibers should be dip-coated within one day of fabrication to ensure good adhesion. If the hydrogel were in contact with any materials with similar dangling silanol functional groups, the condensation would happen across the interface and form covalent interfacial bonding.

A trialkoxysilane was incorporated into the polyisobutylene chains as shown in FIG. 21B. The trialkoxysilane will later crosslink polyisobutylene chains to form butyl rubber, and crosslink polyisobutylene chains and polyacrylamide chains to achieve strong adhesion between the butyl rubber and the hydrogel. The as-received poly(isobutylene-co-isoprene) contains about 98% isobutylene units and 2% of isoprene units. The latter contain carbon double bonds intended for sulfur-based vulcanization. Here the thiol-ene click chemistry was employed to graft a trialkoxysilane with a thiol group (MPTMS) onto the isoprene units. The poly (isobutylene-co-isoprene) is first dissolved (3 g) in cyclohexane (PIB:$C_6H_{12}$=10% wt), and photo-initiator benzophenone (26.6 µL at 0.1 M) and MPTMS (24.7 µL) are then added into the solution. The solution is put in a transparent glass vial, which is laid horizontally under a UV lamp for 1 hour in order to graft MPTMS to the isoprene units of the polyisobutylene chains through the reaction between the carbon-carbon double bond in the isoprene and the thiol group at the end of MPTMS. The vial was turned every 20 minutes to ensure homogeneous exposure. Since the humidity inside the solution is low, the hydrolysis of trialkoxysilane is slow. The modified precursor can be stored at room temperature for a few days. To crosslink the polyisobutylene upon dip-coating, a tin based catalyst (7.1 µL of dibutyltin diacetate) is added to the precursor right before the dip coating as shown in FIG. 21C. Such a catalyst allows the hydrolysis and condensation of the trialkoxysilane even with low humidity.

Since the precursor contains only 10% w/w polybutylisolene, the low concentration of trialkoxysilane and catalyst does not result in fast condensation. Such solution was stored for up to three days at room temperature without noticing any sign of gelation or precipitation. However, the film dries after dip coating. The removal of the solvent brings a ten-fold increase in the concentration of both the trialkoxysilane and the catalyst, which significantly accelerates the hydrolysis of the trialkoxysilane to form silanol functional groups, and the condensation of the latter inside the butyl rubber. The condensation of the silanol groups inside the butyl rubber crosslinks the coating. When butyl rubber B is soaked into cyclohexane, it swells, but doesn't dissolve like the poly(isobutylene-co-isoprene) precursor. This observation demonstrates that the butyl B is indeed crosslinked. The condensation of silanol groups between the polyacrylamide and polyisobutylene chains forms covalent bonds between the butyl rubber and the hydrogel. The sample was steamed with saturated water vapor at 80° C. for 12 hours to achieve fast curing. This procedure ensures that residue cyclohexane (with boiling temperature 68° C.) in the coating is completely removed, while avoiding premature dehydration of the hydrogel. This method allows the crosslinking and the bonding of butyl rubber at a relatively low temperature range that is compatible with hydrogels. In contrast, conventional sulfur based vulcanization requires 200° C. temperature. Even silane based crosslinking procedure in hydrophobic polymers often employs curing above 100° C.

The adhesion energy was measured using a 90° peeling test. The interfacial toughness is about 2.37±0.04 (1 STD) J/m for the hydrogel A-butyl A interface, and is 79.3±13.9 (1 STD) J/m for the hydrogel B-butyl B interface. The adhesion between the butyl B and the hydrogel B is achieved by the condensation of silanol functional groups. Although the humidity inside the rubber is low, near the rubber-hydrogel interface the trialkoxysilane coupling agent should have plenty of chance to be hydrolyzed by water molecules and form silanol functional groups. Such a thin layer of silanol groups is sufficient to form covalent bonding. Using SEM to observe cross-sections of hydrogel-butyl hybrids, it was observed that dip coating generates a uniform thickness of rubber. The butyl B coating still shows excellent conformality to the surface of the hydrogel B, possibly due to in-situ bonding.

Example 14

Testing the Durability of Butyl Rubber Coated Ionic Hydrogels

Tests confirm that butyl-coated hydrogels can retain water during wearing in the open air, and retain salt during washing in a washing machine.

Figure 22:
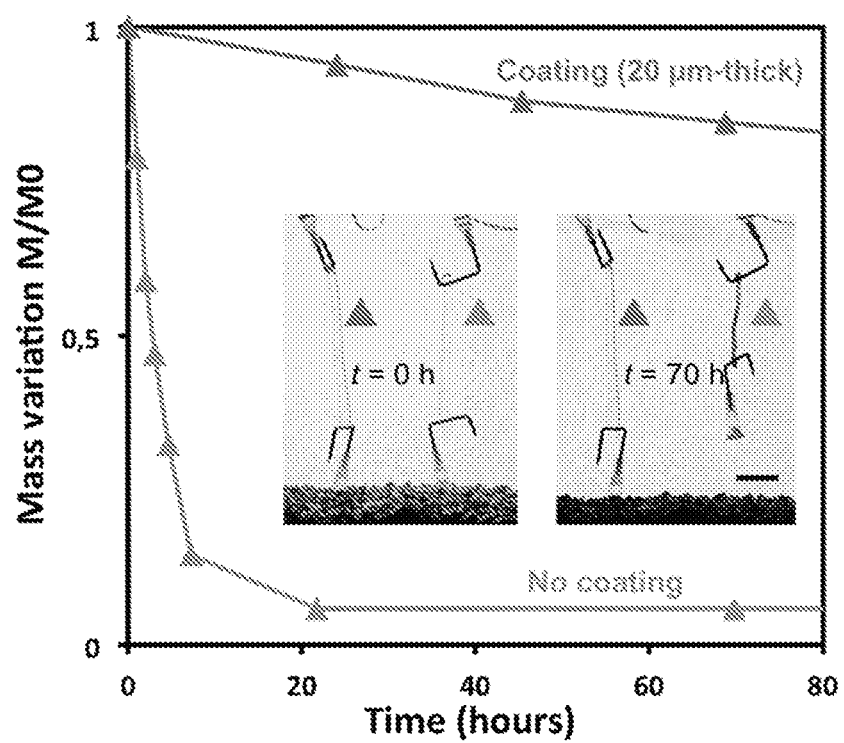
FIG. 22 demonstrates the loss of mass of hydrogel fibers with and with coating in a dry atmosphere (RH≤5%). Hydrogel A and butyl A were used. The insets are photos taken at time zero and 70 hourCs of the hydrogel fibers with or without the butyl rubber coating. Scale bar=1 cm.

In-air and in-water use of butyl rubber-coated hybrids. Butyl rubber coatings can considerably slow down the loss of mass, as shown in FIG. 22. Fibers were placed in a close chamber containing a large amount of desiccant. Relative humidity inside the chamber is below 5%, taken to be 0% with a 5% uncertainty. For this experiment, the hydrogel fibers diameter was 4.8 mm, and their length was 8 cm. Relative humidity of the hydrogels was taken to be 100% because they did not contain any salts. The coated sample had a 20 (±5) μm-thick coating of butyl A. Dip coating (instead of solvent casting for the water-permeability measurements) does not affect the excellent barrier properties of the butyl rubber. Furthermore, sufficiently thin coatings (less than 100 μm) can be processed to design hybrids at the typical size of textile fibers.

Hydrogels containing hygroscopic salts can theoretically have an infinite lifetime if their relative humidity matches the average outside relative humidity. It was next verified that a butyl rubber coating can also slow down diffusion of salts over a long time. Salt diffusion has been studied for polymers used as semi-impermeable membranes for desalinization or plastics in the food packaging industry, but there is no study of salt diffusion in elastomers.

An experiment was designed to measure the loss of salt when exposed to water. Butyl rubber-coated, NaCl-containing hydrogels were soaked in a deionized water bath, while monitoring the electrical conductance of the bath, and the resistance of the hydrogels with time. FIG. 23A is a schematic illustration of the setup used to measure NaCl diffusion through butyl coatings. The fibers (6.4 mm of diameter and 10 cm long) were bended in a U-shape and immerged in 500 mL of deionized water over a 5 cm of length. Conductance G of the bath was measured with time using a Conductivity meter (VWR® Traceable® Pens; 89094-762). For this geometry, and an initial NaCl concentration of 1.71 M (i.e., 10% wt of the water content in the hydrogel), the maximum value of G is $G_{max}$=973 mS (steady value reached after a few hours for a hydrogel fiber without coating). Electrical wires were attached to both ends of the fibers with a stainless steel hook. Only sinusoidal electrical signals were applied at a frequency of 1 kHz using a wave generator (Keysight 33500B) to limit electrochemical reactions at the metal-hydrogel interconnects. For each data point, the resistance R of the fiber was measured through the current-voltage curve, based on four-point measurements. Applied voltages were 0.1, 0.45, 0.8 and 1.0 V. Current was measured with a Fluke 8846A Multimeter. During each measurement, the fiber was pulled out of the bath in order to avoid short circuit. $R_0$ is the value of the resistance, for a given sample, at time t=0. For instance, $R_0$=563Ω for a sample without coating and $R_0$=548Ω for a sample with 160 μm-thick coating at ambient temperature. The experiment was carried out at 20 and 50° C. for two thicknesses of coating (obtained by repeated dip coating), 160 and 240 μm. Samples with a 240 μm-thick coating had no electrodes at the ends, and only the bath conductance was measured. Measurements for samples with and without electrodes are similar, which confirms that there is no leak of salt at interconnects with electrodes. FIG. 23B reports the relative resistance of the fibers change with time, and FIG. 23C reports the relative conductance of the bath changes with time.

It takes about 104 more time to reach a given value of conductance in the bath when a butyl coating of about 200 μm protects the fiber. Diffusion of salt through the coating is not affected by a change in temperature from 20 to 50° C. Over a time of one hour, diffusion of salt in the bath is negligible for the hybrid (less than 0.1% of the maximum conductivity $G_{max}$ is reached). Similarly, the resistance of the fiber is not quantitatively increased over the same timescale. The hybrid can be used in water for hours without leaking salt in its environment. This property should also be significant in the development of stretchable electronic embedded in living tissues or bodies.

Washing. A device that can undergo mechanical deformations under water without major losses of mechanical and electrical properties can be considered "washable." Two experiments were carried out to demonstrate that hydrogels-butyl rubber hybrid fibers are washable.

Figure 8B:
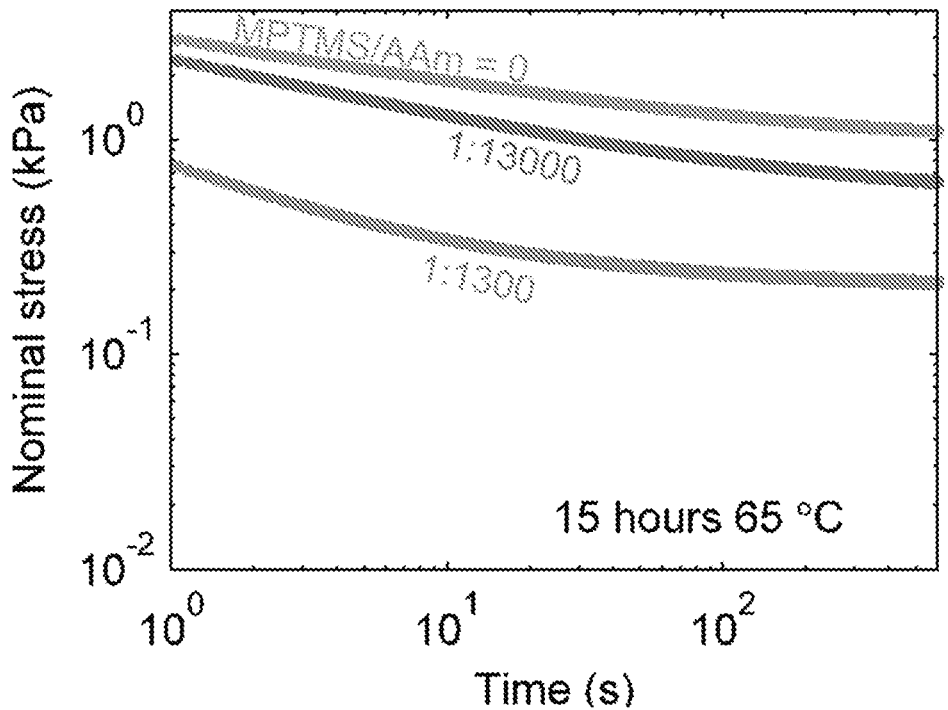
Figure 24:
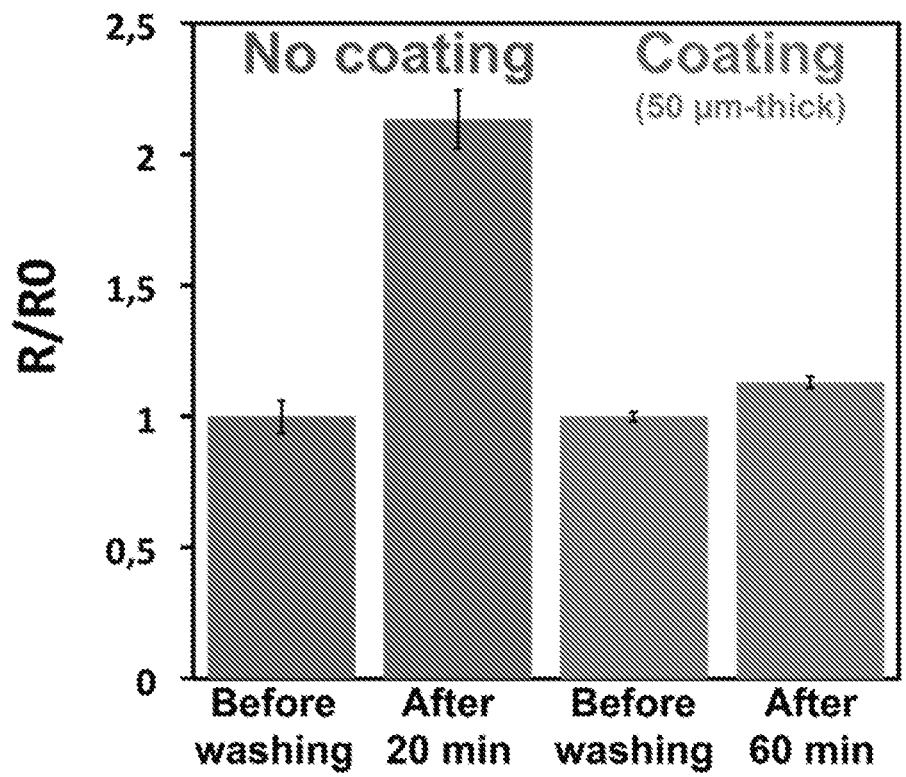
FIG. 24 demonstrates the relative resistance of hydrogel-elastomer hybrid fiber samples before and after washing at 40° C.
Figure 25:
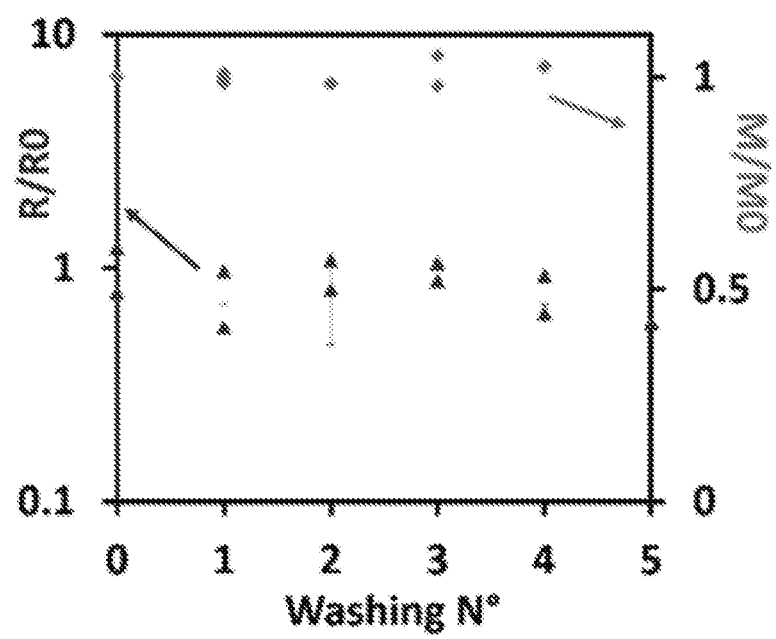
FIG. 25 reports the relative resistance of the fibers and mass variations after multiple cycles of washing.

First, the fibers were cyclically soaked in a heated bath (40° C.) containing a blue dye and soap (Sodium Dodecyl Sulfate, 5 mM), while stretching the fibers cyclically using an INSTRON® machine. The minimum stretch applied was $\lambda=L/L_0=1$ ($L_0$=5 cm) and the maximum stretch applied was $\lambda=1.5$. Extension rate was 5 mm/s. 10 current-voltage points were acquired to determine the resistance of the fiber. The standard deviation is calculated for this dataset, before and after washing (FIG. 8b). The experiment was performed on two fibers (length $L_0$, diameter 4.8 mm): one without coating, and one with a 50 μm (±10 μm)—thick coating of butyl A. After one hour of washing, the resistivity of the hybrid does not vary quantitatively, and it shows no signs of diffusion of the blue dye through the coating, as shown in FIG. 24. It was shown that water-permeability is not affected by uniaxial stretch, and it can be inferred from those results that the same applies probably to the salt, dye, and soap permeability in the butyl rubber.

The second experiment corresponds to more realistic conditions—although less controllable. The butyl rubber-coated hydrogels was washed using a washing machine (Maytag Commercial MHN30PRCWW 27"), with a "normal" washing program, lasting 35 minutes at 40° C., named "white and colors". 11 samples were prepared with the same length and diameter ($L_0$=8 cm, 4.8 mm of diameter), containing an initial NaCl concentration of 2 M and dip coated (one single time) butyl A. The coating's thickness of each sample was measured (using the vernier scale, 10 μm-precision) after the last cycle of washing, because the fiber needed to be cut in order to remove a part of the coating. Thicknesses range from 20 to 40 μm with a Standard Deviation of 8 μm on the dataset. Precision on each measurement could be improved to 5 μm instead of 10 μm, because the hollow cylindrical coating was flattened and the double of the thickness was measured each time. Each hybrid was embedded in the hemline of a sock (FIG. 9a), and put the socks in the machine. The samples were washed multiple times, using the same program (40° C., 35 min), and monitored the resistance and mass of the samples after washing. For each sample, the resistance was measured only once, because it requires piercing through the coating with metallic electrodes, which would have affected further washing cycles. $R_0$ values were estimated based on the mean resistance of 3 samples that were washed 0 times. Up to 5 cycles of washing was carried out, and no significant loss or gain of mass or resistance is detected. The integrity of the coating is still very good (homogeneity, smooth surface, and transparency) as.

A new class of wearable and washable conductors for active textiles is described and enabled. No soft, low-permeability material exists to prevent dehydration, by itself, at the size scale of textile fibers. However, a thin film of butyl rubber, aided with a humectant, makes a hydrogel a wearable and washable conductor. The techniques to dip coat the butyl rubber onto the hydrogel is described herein, using silane condensation reaction to crosslink the butyl rubber, to from strong adhesion between the butyl rubber and the hydrogel. The fibers retain water in the open air, and retain slat during washing. The elastomer retains its low permeability under large deformation. Durable artificial axons under practical conditions will enable broad applications in healthcare, entertainment, and fashion. Butyl rubbers, as well as the silane chemistry, are also compatible with roll-to-roll and digital fabrication. It can be laminated to other elastomers to enable soft robots, and artificial nerves, much like the innerlinings of tubeless tires. The elastic modulus of butyl rubber can be tuned over a large range to be as soft as tissues. The permeability is insensitive to such modifications. Dip coating of hydrogels also open the possibility to combine a broad range of properties by overlaying multiple layers of soft materials. Tires are multifunctional because they use multiple materials. The same principle is applicable to design artificial axons.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

It will be appreciated that while a particular sequence of steps has been shown and described for purposes of explanation, the sequence may be varied in certain respects, or the steps may be combined, while still obtaining the desired configuration. Additionally, modifications to the disclosed embodiments are possible and within the scope of this disclosure.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A polymer composite comprising:
   a hydrogel polymer network;
   an elastomer polymer network, wherein the elastomer polymer network is covalently bonded at an interface to the hydrogel polymer network;
   wherein the hydrogel polymer network is in the form of a fiber that is part of a textile.

2. The polymer composite of claim 1, wherein the covalent bond is a siloxy (Si—O—Si) bond.

3. The polymer composite of claim 1, wherein the hydrogel polymer network is coated with and encapsulated by the elastomer polymer network and the composite is capable of being heated above the boiling temperature of water without losing the hydrogel water content.

4. The polymer composite of claim 1, wherein the elastomer polymer network is selected from the group consisting of polyurethanes, epoxies, silicones, natural rubbers, synthetic rubbers, and a combination thereof.

5. The polymer composite of claim 1, wherein the elastomer polymer network comprises butyl rubber.

6. The polymer composite of claim 1, wherein the hydrogel polymer network is selected from the group consisting of polyacrylates, polyacrylamides, hyaluronates, alginates, and a combination thereof.

7. The polymer composite of claim 1, wherein the polymer composite is dehydration-resistant, wherein:
   the hydrogel polymer network comprises a hygroscopic salt.

8. The polymer composite of claim 7, wherein the covalent bond is siloxy (Si—O—Si) bond.

9. The polymer composite of claim 7, wherein the elastomer polymer network encapsulates the hydrogel polymer network.

10. The polymer composite of claim 7, wherein the hydroscopic salt is selected from lithium chloride, magnesium chloride, sodium chloride (NaCl), sodium hydroxide (NaOH), potassium chloride (KCl) calcium chloride ($CaCl_2$), sodium iodide (NaI), potassium acetate ($CH_3COOK$), and a combination thereof.

11. The polymer composite of claim 7, wherein the polymer composite is washable.

12. The polymer composite of claim 7, wherein the polymer composite is an ionic conductor.

13. The polymer composite of claim 7, wherein the elastomer polymer network is selected from the group consisting of polyurethanes, epoxies, silicones, natural rubbers, synthetic rubbers, and a combination thereof.

14. The polymer composite of claim 7, wherein the elastomer polymer network comprises butyl rubber.

15. The polymer composite of claim 7, wherein the hydrogel polymer network is selected from the group consisting of polyacrylates, polyacrylamides, hyaluronates, alginates, and a combination thereof.

\* \* \* \* \*

UNITED STATES PATENT AND TRADEMARK OFFICE
CERTIFICATE OF CORRECTION

| | | |
|---|---|---|
| PATENT NO. | : 11,702,495 B2 | Page 1 of 1 |
| APPLICATION NO. | : 16/634039 | |
| DATED | : July 18, 2023 | |
| INVENTOR(S) | : Paul Le Floch et al. | |

It is certified that error appears in the above-identified patent and that said Letters Patent is hereby corrected as shown below:

In the Specification

At Column 1, Line numbers 25-29, amend the text as follows:
This invention was made with government support under 1420570 and 1610109 awarded by National Science Foundation (NSF). The government has certain rights in this invention.

Signed and Sealed this
Fifth Day of September, 2023

Katherine Kelly Vidal
*Director of the United States Patent and Trademark Office*